(12) United States Patent
Smith et al.

(10) Patent No.: US 10,110,505 B2
(45) Date of Patent: Oct. 23, 2018

(54) METHODS AND APPARATUS TO MANAGE AND EXECUTE ACTIONS IN COMPUTING ENVIRONMENTS USING A GRAPHICAL USER INTERFACE

(71) Applicant: VMware, Inc., Palo Alto, CA (US)

(72) Inventors: Phillip Smith, Colorado Springs, CO (US); Timothy Binkley-Jones, Peyton, CO (US); Sean Bryan, Colorado Springs, CO (US); Lori Marshall, West Branch, IA (US); Kathleen McDonough, Colorado Springs, CO (US); Richard Monteleone, Colorado Springs, CO (US); David Springer, Colorado Springs, CO (US); Brian Williams, Woodland Park, CO (US); David Wilson, Yorba Linda, CA (US)

(73) Assignee: VMware, Inc., Palo Alto, CA (US)

( * ) Notice: Subject to any disclaimer, the term of this patent is extended or adjusted under 35 U.S.C. 154(b) by 95 days.

(21) Appl. No.: 15/245,300

(22) Filed: Aug. 24, 2016

(65) Prior Publication Data

US 2017/0063709 A1  Mar. 2, 2017

Related U.S. Application Data

(60) Provisional application No. 62/210,338, filed on Aug. 26, 2015, provisional application No. 62/354,107, filed on Jun. 23, 2016.

(51) Int. Cl.
*G06F 9/455* (2018.01)
*H04L 12/911* (2013.01)
(Continued)

(52) U.S. Cl.
CPC .............. *H04L 47/70* (2013.01); *H04L 43/08* (2013.01); *H04L 67/10* (2013.01); *H04L 67/306* (2013.01)

(58) Field of Classification Search
None
See application file for complete search history.

(56) References Cited

U.S. PATENT DOCUMENTS 7,912,900 B1 * 3/2011 Lippert .................... G09B 7/00
434/350
8,166,348 B1 * 4/2012 Kulkarni ............. G06F 11/0793
714/38.1
(Continued)

OTHER PUBLICATIONS

United States Patent and Trademark Office, "Non-Final Office Action," issued in connection with U.S. Appl. No. 15/245,304, dated Feb. 6, 2018, 18 pages. (Copy not provided as this is a USPTO document. Applicant will provide document upon request from Examiner.).

(Continued)

*Primary Examiner* — Adam Lee
(74) *Attorney, Agent, or Firm* — Hanley, Flight & Zimmerman, LLC

(57) ABSTRACT

Methods and apparatus to manage and execute action in computing environments are disclosed. An example system includes a virtual machine resource platform to host a virtual compute node; and a resource manager to: install an interface to receive an adapter configured to initiate an action that operates on the virtual compute node, install the adapter by processing an adapter definition to identify an action specified by the adapter, trigger an alert based on collected data associated with the virtual compute node, in response to the alert, trigger the action to be executed using a parameter extracted from the collected data, and execute the action to operate on the compute node.

18 Claims, 14 Drawing Sheets

(51) Int. Cl.
*H04L 29/08* (2006.01)
*H04L 12/26* (2006.01)

(56) References Cited

U.S. PATENT DOCUMENTS

| | | | |
|---|---|---|---|
| 8,671,176 B1 | 3/2014 | Kharitonov et al. | |
| 8,862,950 B1* | 10/2014 | Ginsberg | G06F 11/3688 |
| | | | 714/25 |
| 8,924,658 B1* | 12/2014 | Bairavasundaram | |
| | | | G06F 3/0611 |
| | | | 709/226 |
| 9,854,001 B1 | 12/2017 | Roth et al. | |
| 2007/0282726 A1* | 12/2007 | Koester | G06Q 40/00 |
| | | | 705/35 |
| 2008/0127041 A1* | 5/2008 | Gura | G06Q 10/06 |
| | | | 717/101 |
| 2009/0177863 A1 | 7/2009 | Rehman et al. | |
| 2009/0287799 A1 | 11/2009 | Tameshige et al. | |
| 2009/0300641 A1* | 12/2009 | Friedman | G06F 11/3664 |
| | | | 718/104 |
| 2010/0122175 A1 | 5/2010 | Gupta et al. | |
| 2010/0312893 A1 | 12/2010 | Watanabe et al. | |
| 2011/0099548 A1 | 4/2011 | Shen et al. | |
| 2012/0131379 A1 | 5/2012 | Tameshige et al. | |
| 2012/0151476 A1 | 6/2012 | Vincent | |
| 2013/0042153 A1* | 2/2013 | McNeeney | G06F 11/366 |
| | | | 714/38.1 |
| 2013/0283263 A1 | 10/2013 | Elemary | |
| 2013/0297922 A1* | 11/2013 | Friedman | G06F 8/63 |
| | | | 713/2 |
| 2014/0123032 A1* | 5/2014 | Lanz | G06Q 10/10 |
| | | | 715/753 |
| 2014/0156908 A1 | 6/2014 | Prakash et al. | |
| 2014/0317527 A1* | 10/2014 | Won | G06F 3/04897 |
| | | | 715/746 |
| 2015/0339180 A1* | 11/2015 | Shih | G06F 11/0793 |
| | | | 714/49 |
| 2016/0104067 A1* | 4/2016 | Xu | G06F 17/30864 |
| | | | 706/46 |
| 2016/0147550 A1 | 5/2016 | McWilliams et al. | |
| 2017/0060636 A1 | 3/2017 | Smith et al. | |
| 2017/0063709 A1 | 3/2017 | Smith et al. | |
| 2017/0063710 A1 | 3/2017 | Smith et al. | |

OTHER PUBLICATIONS

United States Patent and Trademark Office, "Non-Final Office Action," issued in connection with U.S. Appl. No. 15/245,307, dated Feb. 6, 2018, 15 pages. (Copy not provided as this is a USPTO document. Applicant will provide document upon request from Examiner.).

United States Patent and Trademark Office, "Notice of Allowance," issued in connection with U.S. Appl. No. 15/245,304, dated Jun. 15, 2018, 16 pages.

United States Trademark and Patent Office, "Notice of Allowance," issued in connection with U.S. Appl. No. 15/245,307, dated Jun. 28, 2018, 16 pages.

* cited by examiner

METHODS AND APPARATUS TO MANAGE AND EXECUTE ACTIONS IN COMPUTING ENVIRONMENTS USING A GRAPHICAL USER INTERFACE

CROSS REFERENCE TO RELATED APPLICATIONS

This patent claims the benefit of U.S. Provisional Patent Application Ser. No. 62/354,107, filed on Jun. 23, 2016, entitled METHODS AND APPARATUS TO MANAGE AND EXECUTE ACTIONS IN COMPUTING ENVIRONMENTS and U.S. Provisional Patent Application Ser. No. 62/210,338, filed Aug. 26, 2015, entitled METHODS AND APPARATUS TO MANAGE AND EXECUTE ACTIONS IN COMPUTING ENVIRONMENTS. U.S. Provisional Patent Application Ser. No. 62/354,107 and U.S. Provisional Patent Application Ser. No. 62/210,338 are hereby incorporated herein by reference in their entirety.

FIELD OF THE DISCLOSURE

This disclosure relates generally to computing environments, and, more particularly, to methods and apparatus to manage and execute actions in computing environments.

BACKGROUND

Computing environments often include many virtual and physical computing resources. For example, software-defined data centers (SDDCs) are data center facilities in which many or all elements of a computing infrastructure (e.g., networking, storage, CPU, etc.) are virtualized and delivered as a service. The computing environments often include management resources for facilitating management of the computing environments and the computing resources included in the computing environments. Some of these management resources include the capability to automatically monitor computing resources and generate alerts when compute issues are identified. Additionally or alternatively, the management resources may be configured to provide recommendations for responding to generated alerts. In such examples, the management resources may identify computing resources experiencing issues and/or malfunctions and may identify methods or approaches for remediating the issues. Recommendations may provide an end user(s) (e.g., an administrator of the computing environment) with a list of instructions or a series of steps that the end user(s) can manually perform on a computing resource(s) to resolve the issue(s). Although the management resources may provide recommendations, the end user(s) is responsible for implementing suggested changes and/or performing suggested methods to resolve the compute issues.

DETAILED DESCRIPTION

In examples disclosed herein, a computing environment, and/or a monitoring resource, is configured to automatically remediate compute issues while reducing or eliminating the need for user interaction. For example, as disclosed herein, a monitoring resource is configured to perform (or cause performance of) operations and/or functions on computing resources of a computing environment in response to alerts generated by a management resource. To allow users to add operations and/or functionality to the management resource, some example implementations of the monitoring resource allows end users to select and/or install software adapters configured to perform the operations and/or functions on the computing resources. For example, an end user may create a new operation(s) and/or function(s) of a software adapter(s) on computing resources. An end user may create a new software adapter(s) configured to perform a type(s) of operation(s) and/or function(s). Additionally, as disclosed herein, an end user may create new remediation operations and/or functions and apply the new remediation operations and/or functions to a software adapter(s).

Figure 1:
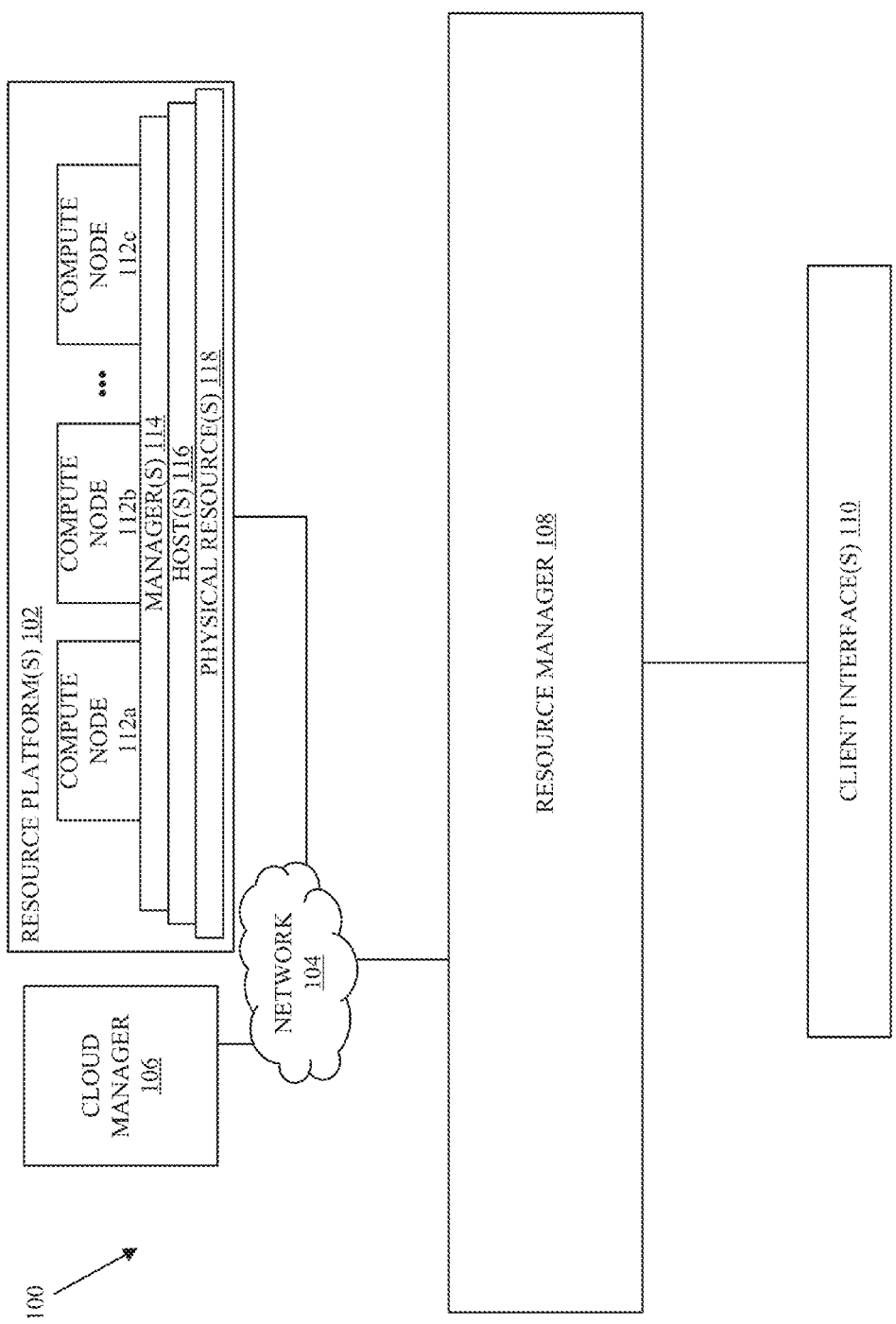
FIG. 1 is a block diagram of an example environment in which an example resource manager is configured to manage resources of an example resource platform.

FIG. 1 is a block diagram of an example environment 100 in which an example resource manager 108 is configured to manage resources of an example resource platform(s) 102. The example resource manager 108 is configured to allow users to install adapters to add additional functionality to the example resource manager 108. For example, the adapters may enable the example resource manager 108 to perform operations that may be used, for example, to remediate computing issues that may arise in the example resource platform(s) 102.

The example computing environment 100 is an SDDC. Alternatively, the example computing environment 100 may be any type of computing resource environment such as, for example, any computing system utilizing network, storage, and/or server virtualization.

The example computing environment 100 includes an example resource platform(s) 102, an example network 104, an example cloud manager 106, an example resource manager 108, and an example client interface(s) 110.

The example resource platform(s) 102 is a collection of computing resources that may be utilized to perform computing operations. The computing resources may include server computers, desktop computers, storage resources and/or network resources. Additionally or alternatively, the computing resources may include devices such as, for example, electrically controllable devices, processor controllable devices, network devices, storage devices, Internet of Things devices, or any device that can be managed by the resource manager 108. In some examples, the resource platform(s) 102 includes computing resources of a computing environment(s) such as, for example, a cloud computing environment. In other examples, the resource platform(s) 102 may include any combination of software resources and hardware resources. The example resource platform(s) 102 is virtualized and supports integration of virtual computing resources with hardware resources. In some examples, multiple and/or separate resource platforms 102 may be used for development, testing, staging, and/or production. The example resource platform 102 includes example compute nodes 112a-c, an example manager(s) 114, an example host(s) 116, and an example physical resource(s) 118.

The example compute nodes 112a-c are computing resources that may execute operations within the example computing environment 100. The example compute nodes 112a-c are illustrated as virtual computing resources managed by the example manager 114 (e.g., a hypervisor) executing within the example host 116 (e.g., an operating system) on the example physical resources 118. The example computing nodes 112a-c may, alternatively, be any combination of physical and virtual computing resources. For example, the compute nodes 112a-c may be any combination of virtual machines, containers, and physical computing resources.

Virtual machines operate with their own guest operating system on a host (e.g., the example host 116) using resources of the host virtualized by virtualization software (e.g., a hypervisor, virtual machine monitor, etc.) (e.g., the example manager 114). Numerous virtual machines can run on a single computer or processor system in a logically separated environment (e.g., separated from one another). A virtual machine can execute instances of applications and/or programs separate from application and/or program instances executed by other virtual machines on the same computer.

In examples disclosed herein, containers are virtual constructs that run on top of a host operating system (e.g., the example compute node 112a-c executing within the example host 116) without the need for a hypervisor or a separate guest operating system. Containers can provide multiple execution environments within an operating system. Like virtual machines, containers also logically separate their contents (e.g., applications and/or programs) from one another, and numerous containers can run on a single computer or processor system. In some examples, utilizing containers, a host operating system uses namespaces to isolate containers from each other to provide operating-system level segregation of applications that operate within each of the different containers. For example, the container segregation may be managed by a container manager (e.g., the example manager 114) that executes with the operating system (e.g., the example compute node 112a-c executing on the example host 116). This segregation can be viewed as a form of virtualization that isolates different groups of applications that operate in different containers. In some examples, such containers are more lightweight than virtual machines. In some examples, a container OS may execute as a guest OS in a virtual machine.

The example compute nodes 112a-c may host a wide variety of different applications such as, for example, an email server, a database server, a file server, a web server, etc.

The example manager(s) 114 manages one or more of the example compute nodes 112a-c. In examples disclosed herein, the example resource platform(s) 102 may include multiple managers 114. In some examples, the example manager (s) 114 is a virtual machine manager (VMM) that instantiates virtualized hardware (e.g., virtualized storage, virtualized memory, virtualized processor(s), etc.) from underlying hardware. In other examples, the example manager(s) 114 is a container engine that enforces isolation within an operating system to isolate containers in which software is executed. As used herein, isolation means that the container engine manages a first container executing instances of applications and/or programs separate from a second (or other) container for hardware.

The example host(s) 116 is a native operating system (OS) executing on example physical resources 118. The example host(s) 116 manages hardware of a physical machine(s). In examples disclosed herein, the example resource platform(s) 102 may include multiple hosts 116. In the illustrated example of FIG. 1, the example host(s) 116 executes the example manager 114. In some examples, certain ones of the hosts 116 may execute certain ones of the managers 114.

The example physical resource(s) 118 is a hardware component of a physical machine(s). In some examples, the physical resource(s) 118 may be a processor, a memory, a storage, a peripheral device, etc. of the physical machine(s). In examples disclosed herein, the example resource platform(s) 102 may include one or more physical resources 118. In the illustrated example of FIG. 1, the example host(s) 116 execute on the physical resource(s) 118.

The example network 104 communicatively couples computers and/or computing resources of the example computing environment 100. In the illustrated example of FIG. 1, the example network 104 is a cloud computing network that facilitates access to shared computing resources. In examples disclosed herein, information, computing resources, etc. are exchanged among the example resource platform(s) 102, the example cloud manager 106, and the example resource manager 108 via the example network 104. The example network 104 may be a wired network, a wireless network, a local area network, a wide area network, and/or any combination of networks.

The example cloud manager 106 of the illustrated example of FIG. 1 manages cloud computing environments (e.g., a cloud computing environment provided by the example resource platform(s) 102. In some examples, the example cloud manager 106 automatically allocates and provisions applications and/or computing resources to end users. To that end, the example cloud manager 106 may include a computing resource catalog from which computing resources can be provisioned. The example cloud manager 106 provides deployment environments in which an end user such as, for example, a software developer, can deploy or receive an application(s). In some examples, the example cloud manager 106 may be implemented using a vRealize® Automation system developed and sold by VMware®, Inc. In other examples, any other suitable cloud computing platform may be used to implement the cloud manager 106.

The example cloud manager 106 collects information about, and measures performance related to the example network 104, the example compute nodes 112a-c, the example manager(s) 114, the example host(s) 116, and/or the example physical resource(s) 118. In some examples, the example cloud manager 106 generates performance and/or health metrics corresponding to the example resource platform 102 and/or the example network 104 (e.g., bandwidth, throughput, latency, error rate, etc.). In other examples, the cloud manager 106 accesses the resource platform(s) 102 to provision computing resources and communicates with the example resource manager 108.

The example resource manager 108 of the illustrated example of FIG. 1 manages and monitors the computing resources of the resource platform(s) 102. The example resource manager 108 analyzes the resource platform(s) 102 and automatically monitors computing resource metrics. In examples disclosed herein, the example resource manager 108 monitors a status(es) of a computing resource(s) of the resource platform(s) 102, identifies computing resource issues, and generates alerts when a threshold(s) is satisfied. When a threshold is satisfied, the example resource manager 108 may facilitate computing issue(s) remediation. In some examples, the resource manager 108 monitors and/or collects performance and/or health metrics such as, for example, bandwidth, throughput, latency, error rate, etc. In some examples, the example resource manager 108 may be implemented using a vRealize® Operations Manager system and/or a vCenter® Operations Manager system developed and sold by VMware®, Inc. In other examples, any other suitable information technology (IT) automation service may be used to implement the example resource manager 108.

In examples disclosed herein, the example resource manager 108 collects information about, and measures performances of, the example compute nodes 112a-c, the example manager(s) 114, the example host(s) 116, and/or the example physical resource(s) 118. In examples disclosed herein, the example resource manager 108 interfaces and/or communicates with the example cloud manager 106 and accesses the example resource platform(s) 102 via the example network 104. Additionally, the example resource manager 108 provides an example client interface(s) 110. The example resource manager 108 uploads adapters to provide actions that may be used, for example, to remediate computing issues that may arise in the example resource platform(s) 102.

In examples disclosed herein, the alerts generated by the example resource manager 108 may be triggered by symptoms. As used herein, symptoms refer to events, occurrences, or underlying instances that cause an alert to be triggered. For example, an alert generated in response to a compute issue(s) experienced by the example host(s) 116 may include symptoms indicative of defects or flaws experienced by an overlaying functional layer(s) such as, for example, the compute nodes 112a-c. In examples disclosed herein, the example resource manager 108 may analyze symptoms to remediate computing issues that may arise in the example resource platform(s) 102.

The example client interface(s) 110 of FIG. 1 is a graphical user interface (GUI) that enables end users (e.g., administrators, software developers, etc.) to interact with the example computing environment 100. The example client interface(s) 110 enables end users to initiate compute issue(s) remediation and view graphical illustrations of compute resource performance and/or health metrics. In some examples, the example client interface(s) 110 may be presented on any type(s) of display device such as, for example, a touch screen, a liquid crystal display (LCD), a light emitting diode (LED), etc. In examples disclosed herein, the example computing environment 100 may include one or more client interfaces 110.

The example client interface(s) 110 presents graphical illustrations of information configured by the example resource manager 108 to an end user(s). In some examples, the example resource manager 108 may identify a computing resource issue(s) and generate an alert(s). Subsequently, the resource manager 108 may visually depict the alert via the client interface(s) 110 to inform an end user(s) of the computing issue(s). In examples disclosed herein, an end user(s) may remediate computing issues via interactions with the example client interface(s) 110. The interactions with the example client interface(s) 110 may instruct the example resource manager 108 to upload adapters to provide actions that may be used, for example, to remediate computing issues that may arise in the example resource platform(s) 102. In examples disclosed herein, an end user(s) may create and configure new operations and/or functions of adapters (e.g., adapters that include actions that are not built-into the example resource manager 108) via the example client interface(s) 110). The example resource manager 108 may install and execute the new action adapters to resolve computing issues in the example resource platform(s) 102 and/or to perform the actions when requested by an end user.

Figure 2:
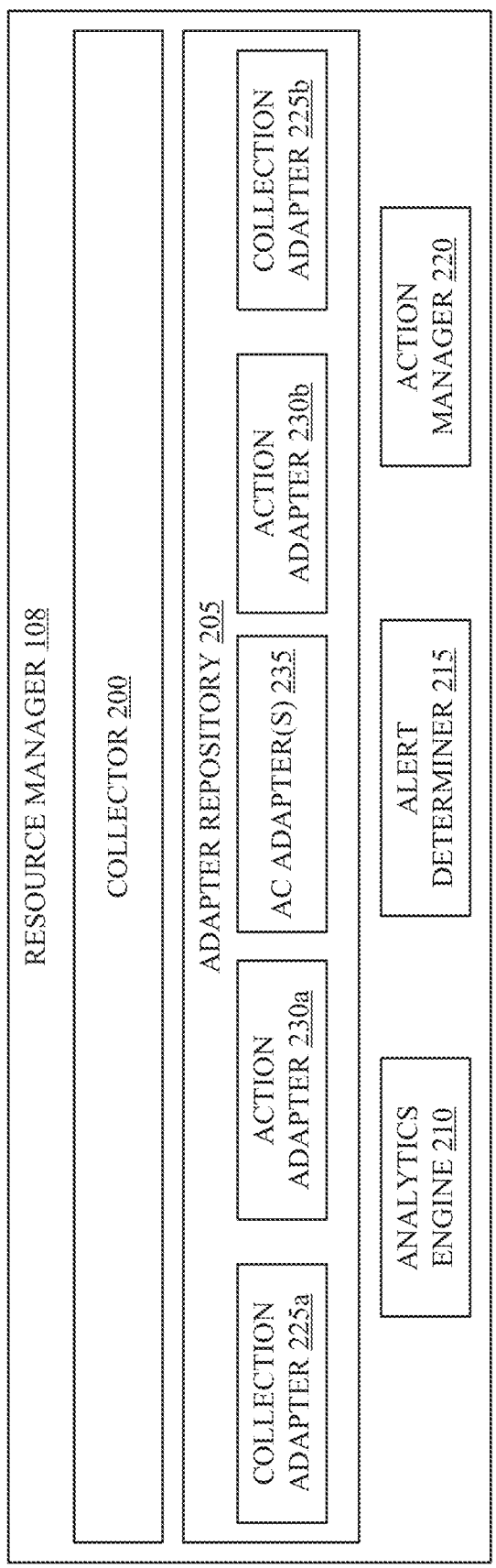
FIG. 2 is a block diagram of an example implementation of the example resource manager of FIG. 1.

FIG. 2 is a block diagram of the example implementation of the resource manager 108 of FIG. 1. The example resource manager 108 includes an example collector 200, an example adapter repository 205, an example analytics engine 210, an example alert determiner 215, and an example action manager 220.

The example collector 200 collects information from the example resource platform(s) 102. In examples disclosed herein, the example collector 200 accesses and/or receives data such as, for example, performance and/or health metrics from the example resource platform(s) 102. The example collector 200 may identify relationships between functional layers of the resource platform(s) 102 (e.g., between the example computer node 112a and the example managers 114, between the example managers 114 and the example hosts 116, etc.) and collect information from the computing resources based on the identified relationships. In other examples, the collector 200 may collect performance and/or health metrics from descendants and/or parents of a compute resource in the resource platform(s) 102. As used herein, a descendant refers to a functional layer(s) and/or a compute resource(s) deriving functionality from an underlying functional layer(s) and/or compute resource(s) such as, for example, the hierarchical representation of the example resource platform(s) 102 shown in FIG. 1. For example, the compute node 112a is a descendent of the example hosts 116. As used herein, a parent refers to a functional layer(s) and/or a compute resource(s) supplying functionality to an overlaying functional layer(s) and/or compute resource(s) of the virtualization architecture. For example, the physical resources 118 are parents of the example hosts 116. In some examples, virtual machines are descendants of their parent hypervisor and descendants of a cluster of virtual machines (e.g., a cloud).

In some examples, the collector 200 may identify that the example compute nodes 112a-b are managed and/or executed by a first, or same, one of the managers 114 whereas the example compute node 112c is managed and executed by a second, or different, one of the managers 114. After identifying that the first one of managers 114 and the second one of the manager 114 are the parents of the compute nodes 112a-c, the collector 200 may collect information from the two example managers 114. The example collector 200 monitors and collects performance and/or health metrics from the example compute nodes 112a-c, the example manager(s) 114, the example host(s) 116, and the example physical resource(s) 118. For example, the example collector 200 may monitor and/or collect information via an application program interface(s) of the resource platform(s)

and/or an application program interface(s) of the example cloud manager 106. In some examples, the example collector 200 may execute instructions, programs, executable code, scripts, etc. to collect data from the example resource platform(s) 102. In examples disclosed herein, the example collector 200 may access and/or retrieve information, such as actions included in installed adapters, from the example adapter repository 205.

The example adapter repository 205 stores adapters used to collect information from, and/or perform operations on, the example resource platform(s) 102. As used herein, adapters refer to instructions, programs, executable code, scripts, etc. that may be installed in the example resource manager 108 to add additional functionality to the example resource manager 108 for monitoring the example computing resources of the example resource platform(s) 102 and/or performing actions on the example computing resources of the example resource platform(s) 102. Some adapters add monitoring and/or collection capabilities to the example resource manager 108 (e.g., an adapter may add the functionality to collect metrics such as, for example, a power state of a virtual machine). The example repository 205 of the illustrated example of FIG. 2 is also capable of storing adapters that can add additional actions (e.g., functions, operations, tasks, etc.) that may be performed on the computing resources of the example resource platform(s) 102. For example, an adapter may include an action that may be performed by the resource manager 108 such as, for example, an action that causes a virtual machine power state to be modified (e.g., to power off a virtual machine).

The example adapter repository 205 may be implemented by a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example adapter repository 205 may additionally or alternatively be implemented by one or more mass storage devices such as a hard drive disk(s), a compact disk drive(s), a digital versatile disk drive(s), etc. While the example adapter repository 205 is illustrated as a single repository in the illustrated example of FIG. 2, the example adapter repository 205 may be implemented by any number and/or type(s) of repository and/or database.

The example adapter repository 205 includes example collection adapters 225a-b, example action adapters 230a-b, and an example action-collection (AC) adapter(s) 235.

The example collection adapters 225a-b are instructions, programs, executable code, scripts, etc. configured to retrieve and collect data. In examples disclosed herein, the example collection adapters 225a-b are configured to collect operational metrics from a compute resource(s). In some examples, the example collection adapters 225a-b may be executed to monitor performance and/or health of computing resources. In other examples, certain ones of the collection adapters 225a-b may be defined, designated, and/or specified to collect certain ones and/or types of operational metrics. Although two collection adapters 225a-b are illustrated in the example of FIG. 1, any number of collection adapters 225a-b may exist in the example computing environment 100.

The example collection adapters 225a-b are stored in the example adapter repository 205. In examples disclosed herein, the example collector 200 may access and/or retrieve ones of the collection adapters 225a-b from the example adapter repository 205. The example collector 200 may subsequently execute ones of the collection adapters 225a-b to monitor and/or collect operational metrics from the example resource platform(s) 102. In some examples, the example collector 200 may access certain ones or types of the collection adapters 225a-b from the adapter repository 205 and subsequently execute the accessed collection adapters 225a-b to monitor and/or collect operational metrics from ones of the example compute nodes 112a-c, the example manager(s) 114, the example host(s) 116, and/or the example physical resource(s) 118 (FIG. 1). In other examples, the example collector 200 accesses and executes ones of the example collection adapters 225a-b to gather information about relationships among the compute resources of the example resource platform(s) 102. For example, the example collection adapters 225a-b may be configured to target and/or discover descendants and/or parents of ones of the compute resources of the resource platform(s) 102. In examples disclosed herein, the example collector 200 may access and execute ones of the collection adapters 225a-b to identify relationships between functional layers of the resource platform(s) 102 such as, for example, which ones of the compute nodes 112a-c are executed by certain ones of the managers 114 and/or hosts 116.

The example action adapters 230a-b are instructions, programs, executable code, scripts, etc. configured to route data and perform actions. As used herein, an action(s) refers to an operation or function performed (or caused to be performed) on one or more computing resources of the resource platform(s) 102. In examples disclosed herein, an action(s) may be performed on the compute resources of the example resource platform(s) 102 such as, for example, the example compute nodes 112a-c, the example manager(s) 114, the example host(s) 116, and/or the example physical resource(s) 118. In some examples, an action(s) may be an operation(s) and/or a function(s) to increase or decrease a quantity of a compute resource(s) such as, for example, increasing or decreasing a number of vCPUs allocated to a virtual machine, increasing or decreasing a memory size of a virtual machine, etc. In other examples, an action(s) may be an operation(s) and/or a function(s) that rearranges or adjusts a virtualization architecture such as, for example, reallocating a virtual machine executed by a first manager 114, to a second, or different, manager 114. In some examples, an action(s) may initiate or terminate execution of ones of the compute resources of the example resource platform(s) 102 such as, for example, shutting down and/or starting up ones of the compute nodes 112a-c, the manager(s) 114, the host(s) 116, and/or the physical resource(s) 118

In examples disclosed herein, the example action adapters 230a-b are configured to perform (or cause performance of) operations and/or functions such as, for example, actions, on a compute resource(s). The example action adapters 230a-b may be accessed and executed to perform certain ones or types of actions on certain ones or types of compute resources. For example, certain ones of the action adapters 230a-b may be defined, designated, and/or specified to perform a type(s) of operation(s) and/or function(s) on a particular type of compute resource(s) (e.g., an action to power off a virtual machine may be identified as applicable only to computing resources that are virtual machines). Although two action adapters 230a-b are illustrated in FIG. 2, any number of action adapters 230a-b may exist in the example computing environment 100 and the example adapter repository 205. In examples disclosed herein, the example action adapters 230a-b may be modified by end users via the example client interface(s) 110 (FIG. 1). In some examples, new action adapters 230a-b may be created by end users via the example client interface(s) 110. In some examples, the example action adapters 230a-b may include an XML file, script, etc. that models a compute resource(s) as a Java object(s). The example action adapters 230*a-b* may also be configured to monitor a status(es) or a condition(s) of an action being executed on a compute resource(s). In examples disclosed herein, the example action adapters 230*a-b* may also include a configuration model(s), which is described in conjunction with FIG. 5.

In examples disclosed herein, the example action adapters 230*a-b* are accessed and executed by the example action manager 220 to perform actions on the example resource platform(s) 102. In some examples, certain ones of the action adapters 230*a-b* are executed by the example action manager 220 to perform a certain type(s) of action on the example compute nodes 112*a-c*, the example manager(s) 114, the example host(s) 116, and/or the example physical resource(s) 118. In other examples, the example action adapters 230*a-b* may perform actions on certain ones of the compute resources of the resource(s) platform 102 monitored by the example collection adapters 225*a-b*.

The example action/collector (AC) adapter(s) 235 of FIG. 2 is an instruction, program, executable code, script, etc. that provides functionality(ies) of the example collection adapters 225*a-b* and functionality(ies) of the example action adapters 230*a-b*. The example AC adapter(s) 235 is configured to retrieve, collect, and route data. The example AC adapter(s) 235 is also configured to perform actions. In examples disclosed herein, the AC adapter 235 may be uploaded and executed by the example collector 200 and the example action manager 220. Although only one example AC adapter(s) 235 is illustrated in FIG. 1, any number of AC adapters 235 may exist in the example computing environment 100 and the example adapter repository 205.

In some examples, the example computing environment 100 may include the example collection adapters 225*a-b*, the example action adapters 230*a-b*, and/or the example AC adapter(s) 235. In other examples, the computing environment 100 may only include the example AC adapters 235, may only include the example action adapters 230*a-b*, etc.

The example analytics engine 210 accesses and/or receives operational (e.g., performance, health, etc.) metrics and generates models. In examples disclosed herein, the models generated by the example analytics engine 210 may be statistical models representative of compute resource(s) performance and/or health. The example analytics engine 210 may access and/or receive operational metrics, drive the operational metrics through one or more algorithms, and generate a model(s) indicative of a compute resource state(s) or condition(s) (e.g., a memory utilization state). In examples disclosed herein, the example analytics engine 210 may compare the generated model(s) against one or more models representative of ideal compute resource performance. In some examples, the models may be probability density functions (PDFs) or any other suitable type of statistical model. Additionally, an "ideal" compute resource performance represented in the model(s) may be specified by a software developer and define an optimal operating point(s) and/or range(s) for a compute resource(s). The example analytics engine 210 may detect and/or identify abnormal operational metrics and/or discrepancies between the generated model(s) and the model(s).

The example analytics engine 210 accesses and/or receives performance and/or health metrics from the example collector 200. In examples disclosed herein, the example analytics engine 210 processes the performance and/or health metrics through one or more algorithms and generates one or more models indicative of compute resource state(s) or condition(s). In some examples, the generated models identify a state(s) and/or a condition(s) of a compute resource(s) of the example resource platform(s) 102. In examples disclosed herein, the example analytics engine 210 may generate models representative of a state(s) and/or a condition(s) corresponding to any of the example compute nodes 112*a-c*, the example manager(s) 114, the example host(s) 116, and the example physical resource(s) 118. For example, the analytics engine 210 may generate a model indicative of a quantity of VMs deployed in a cloud computing environment. In the aforementioned example, the analytics engine 210 may also compare the generated model against a predetermined model suggestive of a recommended and/or an ideal quantity of VMs to be deployed in the same cloud computing environment. In this manner, the example analytics engine 210 may identify that ones of the compute nodes 112*a-c*, the manager(s) 114, the host(s) 116, and/or the physical resource(s) 118 are operating outside of an ideal range based on detecting discrepancies between the generated model(s) and the predetermined model(s).

The example alert determiner 215 identifies whether a compute issue(s) is present in the example resource platform(s) 102 and determines whether or not to generate an alert(s). In some examples, the example alert determiner 215 generates an alert(s) and/or directs others components of the example computing environment 100 to generate the alert(s). The example alert determiner 215 determines whether operational metrics, and/or discrepancies between generated models and predetermined models, satisfy a threshold(s). When the example alert determiner 215 determines the threshold(s) is not satisfied, the example alert determiner 215 does not generate an alert(s). However, when the example alert determiner 215 determines the threshold(s) is satisfied, the example alert determiner 215 generates an alert(s). In examples disclosed herein, the alert(s) may be, for example, a simple network management protocol (SNMP) trap. In some examples, the alert(s) may include an identifier(s) such as, for example, a universal unique identifier (UUID) associated with a compute resource(s) experiencing a compute issue(s). In other examples, the alert(s) may include operational metrics corresponding to a faulty compute resource(s).

The example alert determiner 215 delivers alerts to other components of the example resource manager 108 and/or the example client interface(s) 110. In other examples, the alert triggers or initiates manual (e.g., performed by an end user, requiring user intervention, etc.) and/or automatic (e.g., performed by the example computing environment 100) compute issue(s) remediation.

In examples disclosed herein, the example alert determiner 215 determines whether operational metrics accessed and/or received by the analytics engine 210 satisfy a threshold value. As used herein, a threshold value defines a magnitude and/or a quantity of a computing unit and/or unit of measurement. In some examples, a threshold value is established by a software developer and stored in the example cloud manager 106 and/or the example resource manager 108. For example, the example analytics engine 210 may access and/or receive operational metrics indicating that four virtual machines, executed concurrently by a same manager 114, are deployed in a cloud computing environment. An example threshold value may specify that only three virtual machines may be executed concurrently by the same manager 114 and/or be deployed in the cloud computing environment altogether.

In some examples, the example alert determiner 215 accesses and/or receives the threshold value from the example cloud manager 106 and the operational metrics from the example analytics engine 210. The example alert determiner 215 may subsequently determine that the operational metrics satisfy the threshold value and identify a compute issue(s). In examples disclosed herein, the example alert determiner 215 also determines whether discrepancies between generated models and predetermined models satisfy a threshold range. As used herein, a threshold range defines an extent or scope of computing unit quantities and/or units of measurement. In some examples, a threshold range may also be established by the software developer and stored in the example cloud manager 106 and/or the example resource manager 108. In some examples, the example analytics engine 210 may identify and/or detect a discrepancy such as, for example, a twelve percent difference in net bit rate between a generated network bandwidth model and an ideal, predetermined network bandwidth model. A threshold range may define that a network bandwidth only deviates to +/- ten percent of the ideal, predetermined network bandwidth model. In some examples, the example alert determiner 215 may access and/or receive the threshold range from the example cloud manager 106 and the discrepancies from the example analytics engine 210. The example alert determiner 215 may determine that the discrepancy satisfies the threshold range and identify a compute issue(s).

In examples disclosed herein, the example alert determiner 215 generates an alert(s) and/or directs others components of the example computing environment 100 to generate the alert(s) in response to identification of compute issue(s). In some examples, when a threshold value and/or a threshold range is satisfied, the example alert determiner 215 generates an alert(s) such as, for example, an SNMP trap(s). In some examples, the alert(s) may be delivered to the example cloud manager 106 and/or the example action manager 220 to initiate compute issue(s) remediation. Additionally or alternatively, the alert(s) may be delivered to the example client interface(s) 110 to notify an end user of a compute issue(s).

In some examples, the example alert determiner 215 directs the example cloud manager 106 to generate the alert(s). For example, the example alert determiner 215 may also direct the example cloud manager 106 to generate an SNMP trap(s). The example cloud manager 106 may subsequently deliver the alert(s) to the example action manager 220 to initiate compute issue(s) remediation and/or the example client interface(s) 110 to notify an end user of the compute issue(s).

In some examples, the example alert determiner 215 accesses and/or receives alerts. The example alert determiner 215 evaluates and/or analyzes the alerts. The example alert determiner 215 may also access databases to identify default or recommended compute resource(s) settings and recommendations. In examples disclosed herein, the example alert determiner 215 determines if actions associated with recommendations are applicable in resolving compute resource issues.

The example action manager 220 of the illustrated example of FIG. 2 facilitates remediation of a compute issue(s) in the example computing environment 100. The example action manager 220 accesses and provides recommendations or resolutions for a compute issue(s) in response to alerts. In some examples, the example action manager 220 identifies and selects adapters configured to perform a type(s) of user-selectable operation(s) in response to alerts. Additionally, the example action manager 220 uploads and executes adapters. The example action manager 220 also stores or saves adapters such as, for example, the example action adapters 230a-b and/or the example AC adapter(s) 235 in the adapter repository 205 and monitors the performance and/or health of adapters being executed. In examples disclosed herein, the example action manager 220 may initiate presentation of an interface(s) (e.g., via the example client interface(s) 110) to an end user in response to an alert(s).

The example action manager 220 of FIG. 2 receives an alert(s) from the example alert determiner 215 or the example cloud manager 106. In response to the alert(s), the example action manager 220 analyzes the alert(s) and identifies a compute resource(s) experiencing a compute issue(s) by evaluating an identifier(s) (e.g., a UUID) included in the alert(s). The example action manager 220 accesses parameters associated with the compute resource(s) to determine a recommendation(s) or a compute issue(s) resolution(s). As used herein, a parameter(s) refers to a string(s), an integer(s), and/or a list(s) that defines a default or recommended compute resource(s) setting(s). In some examples, the parameter(s) may be established and/or defined by a software developer. In other examples, the parameter(s) may be defined in Spring Expression Language (SpEL). For example, a parameter associated with a virtual machine type of computing resource may define a default or recommended quantity of virtual central processing units (vCPUs) allocated to the virtual machine. In some examples, the parameter (e.g., the default quantity of vCPUs) is required for optimal performance of the compute resource(s) (e.g., the virtual machine).

The example action manager 220 compare a parameter(s) against an operational metric(s) included in the example alert(s) and determine a recommendation(s). Alternatively, the example analytics engine 210 may compare a parameter(s) against an operational metric(s) included in the alert(s) and determine a recommendation(s) or compute issue(s) resolution(s) to present via the example client interface(s) 110. In some examples, the example action manager 220 may present a recommendation generated by the example analytics engine 210 via the example client interface(s) 110. For example, the action manager 220 and/or the analytics engine 210 may access and/or receive an operational metric indicating that five vCPUs are allocated to and operating within the example compute node 112a. The action manager 220 and/or the analytics engine 210 may also access parameters associated with the example compute node 112a and identify that a maximum of three vCPUs are to be allocated to the compute node 112a for optimal operation of the example compute node 112a. The example action manager 220 and/or the analytics engine 210 may compare the operational metrics (e.g., 5 vCPUs) with the parameters (e.g., indicating a preference for a maximum of 3 vCPUs) and recommend the quantity of vCPUs be reduced via the example client interface(s) 110.

The example action manager 220 may also analyze or evaluate alerts to determine if an action associated with a recommendation is applicable. In examples disclosed herein, the example action manager 220 may receive alerts about a first one of the compute resources of the example resource platform(s) 102, but facilitate remediation actions for a second, or different, ones of the compute resources of the example resource platform(s) 102. For example, an alert may be generated that is indicative of a compute issue(s) associated with the example host(s) 116. However, the action manager 220 and/or the alert determiner 215 may analyze symptoms included in the alert and determine a recommendation that suggests applying an action(s) to ones of the compute nodes 112a-c. In examples disclosed herein, the example action manager 220 may access and execute certain ones of the example action adapters 230a-b and/or AC adapters 235 associated with the action(s) suggested by the recommendation.

In operation of the example resource manager 108 of FIG. 2, the example collector 200 may access collection adapters 225a-b from the example adapter repository 205. The collector 200 may execute the collection adapters 225a-b and collect performance and/or operational metrics from the example compute nodes 112a-c, the example manager(s) 114, the example host(s) 116, and/or the example physical resource(s) 118 of the example resource platform(s) 102. The example analytics engine 210 may access and/or receive performance and/or operational metrics and generate a model(s) indicative of a compute resource(s) state(s) or condition(s). The example analytics engine 210 may subsequently compare the generated model against one or more predetermined models. In examples disclosed herein, the example alert determiner 215 identifies whether the performance and/or the operational metrics satisfy a threshold (e.g., a threshold range and/or threshold value) based on the generated and predetermined models. If the example alert determiner 215 determines the threshold is satisfied, the example alert determiner 215 generates an alert. The example action manager 220 responds to the alert by facilitating remediation of an identified compute issue(s). The example action manager 220 determines an action defined by a recommendation for the alert and presents a user interface via the example client interface(s) 110. The action manager 220 provides remediation recommendations to an end user(s), which may include an action of the example action adapters 230a-b and/or the example AC adapter(s) 235 from the example adapter repository 205. For example, the action manager 220 may determine if an applicable action has been loaded into the example resource manager 108 via the example action adapters 230a-b and/or the example AC adapter(s) 235 and may determine whether the end-user accessing the user interface of the example client interface(s) 110 has permission to access a recommended action from the example action adapters 230a-b and/or the example AC adapter(s) 235. When an applicable action is located and the end-user has permission to access the action, the example action manager 220 presents the action in the user interface via the example client interface(s) 110 and/or automatically performs the action. If the action is not automatically performed, the end-user may then request that the action manager 220 initiate performance of the example action.

While an example manner of implementing the example resource manager 108 of FIG. 1 is illustrated in FIG. 2, one or more of the elements, processes and/or devices illustrated in FIG. 2 may be combined, divided, re-arranged, omitted, eliminated and/or implemented in any other way. Further, implementing the example collector 200, the example adapter repository 205, the example analytics engine 210, the example alert determiner 215, the example action manager 220, the example collection adapters 225a-b, the example action adapters 230a-b, and the example AC adapter(s) 235 of FIG. 2 may be implemented by hardware, software, firmware and/or any combination of hardware, software and/or firmware. Thus, for example, any of the example collector 200, the example adapter repository 205, the example analytics engine 210, the example alert determiner 215, the example action manager 220, the example collection adapters 225a-b, the example action adapters 230a-b, and the example AC adapter(s) 235 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example collector 200, the example adapter repository 205, the example analytics engine 210, the example alert determiner 215, the example action manager 220, the example collection adapters 225a-b, the example action adapters 230a-b, and the example AC adapter(s) 235 are hereby expressly defined to include a tangible computer readable storage device or storage disk such as a memory, a digital versatile disk (DVD), a compact disk (CD), a Blu-ray disk, etc. storing the software and/or firmware. Further still, the example resource manager 108 of FIG. 1 may include one or more elements, processes and/or devices in addition to, or instead of, those illustrated in FIG. 2, and/or may include more than one of any or all of the illustrated elements, processes and devices.

Figure 3:
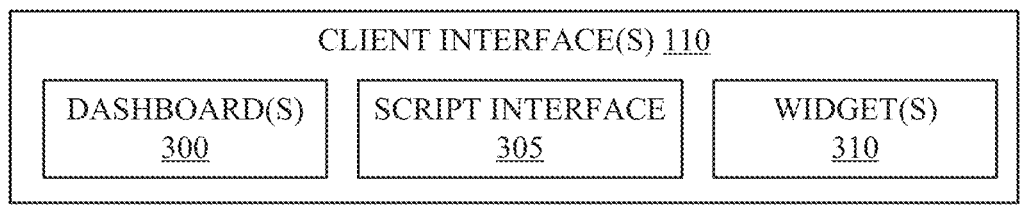
FIG. 3 is a block diagram of an example client interface of FIG. 1.

FIG. 3 is a block diagram of an example implementation of the example client interface(s) 110 of FIG. 1. The example client interface(s) 110 includes an example dashboard(s) 300, an example script interface 305, and an example widget(s) 310.

The example dashboard(s) 300 is a GUI that displays a status(es) or condition(s) of a compute resource(s) of the example resource platform 102 in the example computing environment 100. The example dashboard(s) 300 may graphically illustrate trends in compute resource(s) performance and visually display operational metrics. In examples disclosed herein, one or more dashboards 300 may be present in the example computing environment 100. In some examples, one or more dashboards 300 may graphically illustrate operational metrics and/or models for one or more compute resources. The example dashboard(s) 300 may provide a summary, or a recap, of a compute resource performance during and/or after a time period or interval. In some examples, the dashboard(s) 300 displays alerts generated by the example computing environment 100. The dashboard(s) 300 enables end users to view and interpret compute resource(s) conditions and statuses.

In the illustrated example of FIG. 3, the example dashboard(s) 300 may present graphical illustrations of operational metrics collected by the example collector 200. In some examples, the example dashboard(s) 300 displays models generated by the example analytics engine 210 and displays alerts generated by the example alert determiner 215 and/or the example cloud manager 106. In examples disclosed herein, the example dashboard(s) 300 may present operational metrics and/or models corresponding to the example compute nodes 112a-c, the example manager(s) 114, the example host(s) 116, and/or the example physical resource(s) 118. The example dashboard(s) 300 may also display statuses of operations performed by the example adapters 230a-b, 235. For example, the example dashboard(s) 300 may display an image indicating an operation performed by certain ones of the action adapters 230a-b timed out, completed, failed, etc.

The example script interface 305 is an interface that accepts new actions that may be added to adapters of the resource manager 108. New actions may be uploaded and/or added to the example resource manager 108 to extend the functionality of the resource manager 108. For example, new actions can be implemented by scripts for execution that may be written in any programming language for which an interpreter or execution engine is installed in the resource manager 108 (e.g., actions may be implemented in, for example, Windows Powershell® command-line shell commands, Python command-line interface script, HTTP command-line interface commands, representational state transfer (REST) interface commands, and/or an external server). The example script interface 305 saves new actions in the adapters 230a-b, 235 of the example adapter repository 205. In some examples, the adapters uploaded by end users via the script interface 305 are saved in the adapter repository 205 by the action manager 220 and made accessible and/or executable in response to future alerts. In examples disclosed herein, an end user may configure a new action via the example script interface 305 and apply the new action to an existing adapter(s) (e.g., one(s) of the adapters 230a-b, 235 of the example adapter repository 205).

The example widget(s) 310 is a GUI icon or indicator that, upon selection, performs a function or operation in the example computing environment 100. The example widget(s) 310 displays information and/or illustrations that invite an end user to act. In some examples, the example widget(s) 310 may serve as a gateway to an application programmable interface (API) for managing action configuration. In examples disclosed herein, one or more widgets 310 may be displayed via the example client interface(s) 110. In some examples, the example widget(s) 310 may be a button, dialog box, pop-up window, pull-down menu, scroll bar, selection box, menu bar, toggle switch, etc. In examples disclosed herein, selection of the example widget(s) 310 may initiate execution of a particular operation and/or cause data to be routed to and/or received by different components of the example computing environment 100. In some examples, the example widget(s) 310 may include a graphically illustrated recommendation(s) or compute issue(s) resolution(s) in response to an alert(s).

In examples disclosed herein, an end user is provided with one or more widgets 310 in response to an alert(s). The one or more widgets 310 may be displayed to the end user with a recommendation(s) or compute issue(s) resolution(s), provided by the example action manager 220. The one or more widgets 310 may include one or more different widgets 310 selectable via a pull-down menu, scroll bar, etc. that enable a user to perform an action(s) on the example computing environment 100. In examples disclosed herein, ones of a certain type(s) of widget(s) 310 may be designated for execution of ones of a certain type(s) of action. For example, a first type(s) of widget(s) 310 may be selectable to increase or decrease a volume of a compute resource(s) while a second, or different, type(s) of widget(s) 310 may be selectable to shut down and/or start up ones of the compute resources of the example resource platform(s) 102. In some examples, selection of a widget(s) 310 by an end user may initiate execution of a designated action.

In some examples, selection of a widget(s) 310 may induce display of a different widget(s) 310 in the example client interface(s) 110. For example, selection of a widget(s) 310 corresponding to execution of a type(s) of action may automatically present a different type(s) of widget(s) 310 displaying characteristics, settings, specifications, etc. of the type(s) of action. For example, if the selected widget(s) 310 is designated for an action to increase and/or decrease a volume of vCPUs allocated to a virtual machine, the different type(s) of widget(s) 310 presented may include dialog boxes, pull-down menus, text-entry fields, etc. displaying a quantity of vCPUs currently allocated to the virtual machine. In some examples, the different widget(s) 310 induced in response to selection of a first widget(s) 310 may enable an end user to modify the quantity of vCPUs via text-entry fields. In other examples, selection of the first widget(s) 310, and/or the different widget(s) 310, may cause the example action manager 220 to facilitate compute issue(s) remediation by preparing an action to be executed.

When the example alert determiner 215 generates an alert(s), one or more example widgets 310 may be presented via the example client interface(s) 110. In examples disclosed herein, selection of certain ones of the widgets 310 causes the example action manager 220 (FIG. 2) to facilitate automatic compute issue(s) remediation by selecting certain ones of the action adapters 230a-b to perform the action corresponding to the selected widget 310. As used herein, automatic compute issue(s) remediation refers to automatically selecting the example action adapters 230a-b, and/or the example AC adapter(s) 235, in response to user-selection of a widget(s) 310. In some examples, when an end user selects a widget(s) 310 to execute a particular action, the example computing environment 100 performs automatic compute issue(s) remediation. The example action manager 220 identifies, and selects the example action adapters 230a-b required for execution of the action. In some examples, the example action manager 220 may select certain ones of the action adapters 230a-b and/or AC adapters 235 to perform actions on certain ones of the computing resources of the resource platform(s) 102. For example, the action manager 220 may identify, select, and upload a plurality of action adapters 230a-b and/or AC adapters 235 to decrease a quantity of vCPUs allocated to a virtual machine but identify, select, and upload a different plurality of action adapters 230a-b and/or AC adapters 235 to increase a memory size of the same or a different virtual machine.

In some examples, selection of certain ones of the widgets 310 causes the example action manager 220 to launch the example script interface 305 via the example client interface(s) 110. In examples disclosed herein, the example computing environment 100 facilitates manual compute issue(s) remediation when (i) an end user selects a widget(s) 310 designated for a particular action(s) or (ii) an end user decides to create a new action by modifying an existing adapter such as, for example, the example action adapter 230a-b and/or the example AC adapter(s) 235. In response to manual compute issue(s) remediation, an end user can add new actions to the example action adapters 230a-b and/or the example AC adapters 235 by configuring, manipulating, and modifying existing, or stored, action adapters 230a-b and/or AC adapters 235 via the script interface 305.

While an example manner of implementing the example client interface 110 of FIG. 1 is illustrated in FIG. 3, one or more of the elements, processes and/or devices illustrated in FIG. 3 may be combined, divided, re-arranged, omitted, eliminated and/or implemented in any other way. Further, implementing the example dashboard(s) 300, the example script interface 305, and the example widget(s) 310 of FIG. 2 may be implemented by hardware, software, firmware and/or any combination of hardware, software and/or firmware. Thus, for example, any of the example dashboard(s) 300, the example script interface 305, and the example widget(s) 310 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example dashboard(s) 300, the example script interface 305, and the example widget(s) 310 are hereby expressly defined to include a tangible computer readable storage device or storage disk such as a memory, a digital versatile disk (DVD), a compact disk (CD), a Blu-ray disk, etc. storing the software and/or firmware. Further still, the example client interface(s) 110 of FIG. 1 may include one or more elements, processes and/or devices in addition to, or instead of, those illustrated in FIG. 3, and/or may include more than one of any or all of the illustrated elements, processes and devices.

Figure 4:
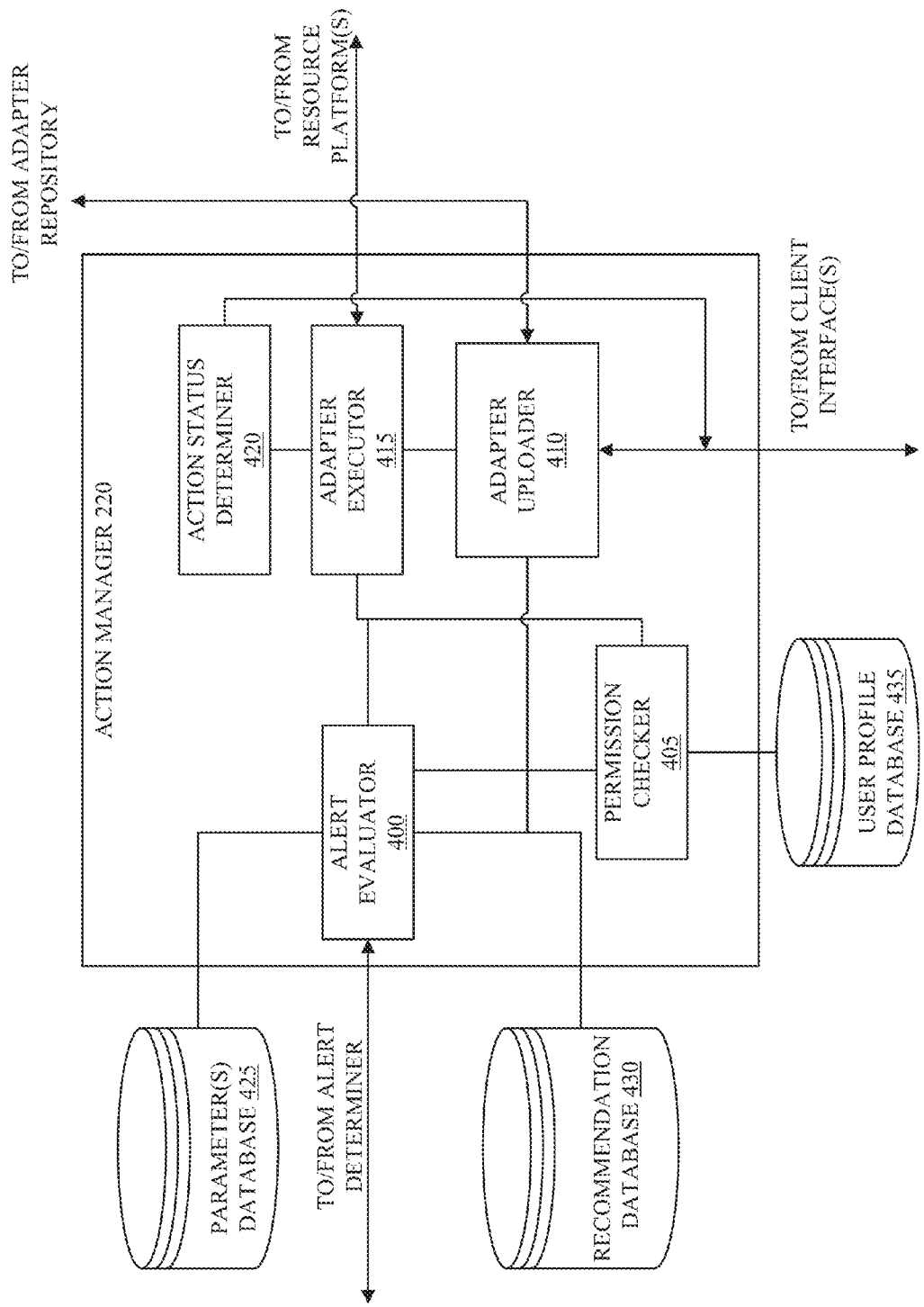
FIG. 4 is a block diagram of an example environment in which an example implementation of the action manager of FIG. 2 may operate to monitor and perform actions on a resource platform.

FIG. 4 is a block diagram of an example implementation of the example action manager 220 of FIG. 2. The example action manager 220 includes an example alert evaluator 400, an example permission checker 405, an example adapter uploader 410, an example adapter executor 415, and an example action status determiner 420, an example parameters database 425, an example recommendation database 430, and an example user profile database 435.

The example alert evaluator 400 accesses and/or receives alerts. The example alert evaluator 400 evaluates and/or analyzes alerts. The example alert evaluator 400 may also access databases to identify default or recommended compute resource(s) settings and recommendations. In examples disclosed herein, the example alert evaluator 400 determines if actions associated with recommendations are applicable in resolving compute resource issues. In some examples, the alert evaluator 400 determines whether certain recommendations and/or actions are applicable in resolving compute issues based on permissions. The example alert evaluator 400 also attempts to determine an action defined by a recommendation for the alert. In some examples, the example alert evaluator 400 determines whether a compute issue(s) can be resolved automatically in response to an alert(s).

The example permission checker 405 accesses a database to determine whether an end user has permission to access and/or perform an action. In examples disclosed herein, the example permission checker 405 may analyze end user(s) profiles to determine whether certain action options (e.g., ones of the example widgets 310 corresponding to actions) are presented to an end user(s).

The example adapter uploader 410 uploads adapters to a repository (e.g., the example adapter repository 205) to install the adapters in the example resource manager 108.

The example adapter executor 415 executes adapters and performs compute issue remediation(s) on the compute resources of the example resource platform(s) 102. The example adapter executor 415 accesses and/or receives the example action adapters 230a-b and/or the example AC adapter(s) 235 from the example adapter uploader 410. In examples disclosed herein, the example adapter executor 415 executes the example action adapters 230a-b and/or the example AC adapters 235 retrieved by the example adapter uploader 410 to perform an action on ones of the compute resources of the example resource platform(s) 102. The example action executor 415 accesses and/or receives and executes the example adapters 230a-b, 235 in response to automatic or manual compute issue(s) remediation. The example adapter executor 415 also accesses and/or receives and executes one(s) of the example adapters 230a-b, 235 in response to an alert(s). In other examples, the example adapter executor 415 accesses and/or receives and executes one(s) of the example adapters 230a-b, 235 at times when an alert is not generated (e.g., a user initiates compute issue(s) remediation via the example client interface(s) 110).

The example action status determiner 420 monitors the adapters 230a-b, 235 being executed by the example adapter executor 415. The example action status determiner 420 also determines a status(es) and/or a condition(s) of the action being performed and/or the adapter 230a-b, 235 being executed. In some examples, the example action status determiner 420 polls the example adapter executor 415 and/or the executing adapters 230a-b, 235 to sample a status(es) and/or a condition(s). In examples disclosed herein, the example action status determiner 420 may determine a status(es) and/or a condition(s) of the action and/or the adapter 230a-b, 235 such as, for example, an unknown status, a checking status, a completed action status, a failed action status, a timed out status, a canceled action status, a non-dispatch-able action status, etc. In examples disclosed herein, the example action status determiner 420 may present the status(es) or condition(s) of the action and/or the adapter 230a-b, 235 via the example client interface(s) 110. In examples disclosed herein, the example action status determiner 420 may execute polling operations to determine a status(es) or a condition(s) of an action being performed and/or of an adapter being executed.

The example parameter(s) database 425 stores parameters associated with the compute resource(s) of the example resource platform(s) 102. For example, the example parameter(s) database 425 may store parameters or information defining a default or recommended compute resource(s) setting(s).

The example recommendation database 430 stores recommendations and/or resolutions for compute issues experienced by ones of the compute resources of the example resource platform(s) 102. For example, the example recommendation database 430 may store recommendations or resolutions that suggest an end user(s) perform remediation approaches such as, for example, adding a new virtual hard disk(s) to expand an existing disk(s) of a virtual machine(s), adding more CPU capacity, adding capacity to a data store, bringing any failed hosts online or resolving a network partition if one exists, etc. In examples disclosed herein, the example recommendation database 430 may store the recommendations or resolutions in any format suitable for presentation to an end user(s) such as, for example, a .txt file, etc. In examples disclosed herein, the recommendations or resolutions stored in the example recommendation database 430 may include actions associated with the recommendations or resolutions. The actions associated with the recommendations or resolutions may be applicable to one or more of the example compute resources of the example resource platform(s) 102. For example, a recommendation suggesting an end user(s) add more CPU capacity may include actions that may be applied to the example host(s) 116, the example manager(s) 114, and/or the example compute nodes 112a-c. Such actions may include setting CPU resources for the example host(s) 116, setting CPU resources for the example manager(s) 114, and setting CPU resources for the example compute nodes 112a-c. In other examples, the actions included with a particular recommendation or resolution may perform different operations or functions. For example, actions associated with a recommendation suggesting an end user(s) add more CPU capacity may include, for example, shutting down ones of the example hosts 116 executing ones of the example compute nodes 112a-c, setting memory for ones of the compute nodes 112a-c, setting a CPU count for ones of the example compute nodes 112a-c, etc.

The example user profile database 435 stores user profiles associated with end users. In examples disclosed herein, user profiles are indicative of compute resources of the resource platform(s) 102 allocated to end users and/or identify entitlements indicative of compute resources that the end users are entitled access. The user profiles also identify entitlements indicative of actions that the end users are entitled access. The user profiles also identify widgets 310 the end user(s) is able to view and to select. While the example user profile database 435 is illustrated as a stand-alone database, in some examples, the user profile database 435 may be implemented within the example permission checker 405.

In operation, the example alert evaluator 400 accesses and/or receives alerts from the example alert determiner 215 (FIG. 2). In examples disclosed herein, the example alert determiner 215 evaluates and/or analyzes the alert and/or symptoms associated with the alert. For example, the alert determiner 215 may determine if an action has been automated for the particular alert. The example alert evaluator 400 and/or the example alert determiner 215 identifies ones of the compute resources of the example resource platform(s) 102 associated with the alert. For example, the alert evaluator 400 and/or the alert determiner 215 may identify UUIDs and/or operational metrics associated with the example host(s) 116. The example alert evaluator 400 and/or the example alert determiner 215 may also identify symptoms included in the alert. The example alert evaluator 400 and/or the example alert determiner 215 analyzes the symptoms to determine underlying or overlying functional layers that contribute to the compute issue(s) experienced by ones of the compute resources of the example resource platform(s) 102. For example, the example alert evaluator 400 and/or the example alert determiner 215 may receive an alert and/or symptoms corresponding to the example host(s) 116 and identify defects or errors of ones of the example compute nodes 112a-c executed by the example host(s) 116.

The example alert evaluator 400 and/or the example alert determiner 215 accesses the example parameter(s) database 425. The example alert evaluator 400 and/or the alert determiner 215 accesses the example parameter(s) database 425 and evaluates retrieved parameters. The alert evaluator 400 and/or the alert determiner 215 may access parameters such as, for example, recommended or default quantities of compute resources associated with the alert. For example, the alert evaluator 400 may receive, or the alert determiner 215 may determine, an alert indicating that a quantity of vCPUs allocated to the compute node 112a is oversized and subsequently access the example parameter(s) database 425 to determine a recommended or default quantity of vCPUs that should be allocated to the example compute node 112a (e.g., as defined by a software developer). The example alert evaluator 400 and/or the example alert determiner 215 evaluates and/or analyzes UUIDs and operational metrics received via the alert and parameters accessed via the example parameter(s) database 425 to determine a recommendation(s) for remediating the cause of the alert.

The example alert evaluator 400 and/or the example alert determiner 215 may evaluate and/or analyze UUIDs and/or operational metrics received via the alert and parameters accessed via the example parameter(s) database 425 to determine a recommendation(s) from the example recommendations database 430 that supports compute issue(s) remediation. In some examples, the example alert evaluator 400 and/or the example alert determiner 215 compares operational metrics received in the alert to quantities of compute resources defined in parameters in order to determine an appropriate recommendation or resolution. The example alert evaluator 400 and/or the example alert determiner 215 may subsequently select and/or retrieve ones of the recommendations or resolutions.

In examples disclosed herein, the example alert evaluator 400 may also identify, select, and/or populate actions associated with the selected recommendation(s) or resolution(s) that are applicable in resolving the compute issue(s). The example resource manager 108 may present the selected action option(s) and the example recommendation via the example client interface(s) 110. As used herein, a selected action option refers to an action selected or retrieved by the example action evaluator 400 that an end user(s) may execute.

For example, the example alert evaluator 400 may access and select a recommendation to add more CPU capacity. The recommendation to add more CPU capacity may include actions applicable to the example compute nodes 112a-c, the example manager(s) 114, and the example host(s) 116. In such examples, the example alert evaluator 400 may populate the applicable actions related to the example compute nodes 112a-c, the example manager(s) 114, and the example host(s) 116.

In some examples, the example alert determiner 215 may determine the operational metrics received via the alert are operational metrics satisfying thresholds corresponding to the example host(s) 116. In examples disclosed herein, the example alert evaluator 400 may identify, select, and/or populate actions that support resolving a compute issue(s) experienced by the host(s) 116. In some examples, the example alert evaluator 400 may identify, select, and/or populate actions associated with the example host(s) 116 and/or the example compute nodes 112a-c such as for example, setting a CPU count for ones of the example host(s) 116 and/or the example compute nodes 112a-c. The example alert evaluator 400 may determine certain actions are not linked or configured for resolving the compute issue(s) and may not select and/or populate those actions. In some examples, the alert evaluator 400 may not select and/or populate actions and/or recommendations associated with ones of the functional layers that do not contribute to the example compute issue(s). For example, the example alert determiner 215 may determine that the health or performance of the example manager(s) 114 does not contribute to a compute issue(s) experienced by the example host(s) 116. The alert evaluator 400 may not select and/or populate actions that are configured to perform operations or functions on the example manager(s) 114 as a result.

In some examples, the example alert evaluator 400 may determine that no actions associated with recommendations or resolutions are available. In such examples, a notification may be presented to an end user(s) via the example client interface(s) 110 to inform the end user(s) that no action(s) exists. To that end, the end user(s) may, via the example client interface(s) 110, be provided with operational metrics that triggered the alert and the end user(s) may subsequently perform manual remediation.

The example permission checker 405 accesses an example user profile database 435. The example permission checker 405 may access the example user profile database 435 to determine if an end user is entitled access to certain actions and/or widgets 310. For example, the example permission checker 405 may access the example user profile database 435 in response to selection, or retrieval, of recommendations and corresponding actions by the example alert evaluator 400. The example permission checker 405 may determine whether an end user(s) is entitled access to a selected action option(s). In some examples, the example permission checker 405 may identify that an end user(s) is an administrator(s) by analyzing user profiles stored in the example user profile database 435. The example permission checker 405 may subsequently determine the administrator(s) is entitled access to none, ones, or all of the selected action options. The example permission checker 405 may also determine that none, ones, or all of the selected action options are to be presented to the administrator(s) via the example client interface(s) 110. In examples disclosed herein, the example permission checker 405 may communicate the selected action options that the end user(s) is, or is not, entitled to access to the example alert evaluator 400.

Based on the selected action options that the end user(s) is, or is not, entitled to access, the example alert evaluator 400 rejects certain ones of the selected action options. In some examples, the example alert evaluator 400 rejects certain ones or all of the selected action options that an end user is not entitled access. In such examples, the certain ones or all of the selected action options that an end user is denied (e.g., not entitled) access are not presented to the end user via the example client interface(s) 110. In other examples, an end user is entitled access to all of the selected action options and the example alert evaluator 400 preserves the selected action options. In such examples, the end user(s) may be presented all of the selected action options (e.g., no action options are concealed, or hidden, from the user via the client interface(s) 110). In examples disclosed herein, the example alert evaluator 400 sends the remaining selected action options to the example adapter uploader 410.

The example adapter uploader 410 accesses and/or receives the selected action option(s) from the example alert evaluator 400. In examples disclosed herein, the example adapter uploader 410 presents one or more example widgets 310 via the example client interface(s) 110. The one or more widgets 310 display the recommendation(s) and/or the selected action option(s) selected, or retrieved, by the example alert evaluator 400. In some examples, an end user may select one or more of the example widgets 310 such as, for example, a pull-down menu, and the selected action options(s) may be displayed. In other examples, the example widgets 310 representative of the selected action option(s) may be displayed without user-selection of any one or type(s) of the example widget(s) 310. The example adapter uploader 410 may perform manual or automatic compute issue(s) remediation.

The example adapter uploader 410 facilitates manual compute issue(s) remediation in response to an alert when (i) an end user selects a widget(s) 310 designated to a selected action option(s) selected, or retrieved, by the example alert evaluator 400 or (ii) an end user selects a widget(s) 310 designated to create a new action. When an end user selects a widget(s) 310 designated to a selected action(s) option selected, or retrieved, by the example alert evaluator 400, the example adapter uploader 410 identifies and determines example action adapters 230*a-b* and/or AC adapters 235 required to execute a selected action (e.g., a selected action option(s) selected by an end user(s)). The example action uploader 410 accesses the example adapter repository 205 and communicates certain ones of the example action adapters 230*a-b* and/or AC adapters 235 required to execute the selected action to the example adapter executor 415. In some examples, the example adapter uploader 410 de-serializes certain ones of the example action adapters 230*a-b* and/or AC adapters 235 into executable objects (e.g., Java objects) that may be executed by the example adapter executor 415. To that end, the example adapter uploader 410 identifies and determines example action adapters 230*a-b* and/or AC adapters 235 required to perform any type(s) of action. In other examples, the adapter uploader 410 de-serializes the identified adapters 230*a-b* and/or 235 into Java objects using a configuration model(s) included in the example adapters 230*a-b*, 235.

Alternatively, an end user(s) may configure the example computing environment 100 to perform automatic compute issue(s) resolution by selecting certain ones of the example widgets 310 of the example client interface(s) 110. By selecting certain ones of the example widgets 310, a user may configure the example alert evaluator 400 to select an action in response to an alert. For example, the example alert evaluator 400 may be configured by an end user(s) to determine whether a received alert should result in automatic compute issue(s) remediation. In such examples, the example alert evaluator 400 may direct the example adapter uploader 410 to automatically upload appropriate adapters to perform an action without presenting a selected action option(s) to an end user(s) via the example client interface(s) 110. In such examples, the example adapter executor 415 may automatically execute the appropriate adapters. By selecting certain ones of the example widgets 310, an end user(s) may configure the example adapter uploader 410 to automatically upload and cause the example adapter executor 415 execute example action adapters 230*a-b* and/or AC adapters 235 corresponding to an action(s) selected by the example alert evaluator 400. Once the end user(s) configures the example adapter uploader 410 and the example adapter executor 415 for automatic execution, the example adapter executor 415 may be configured to automatically execute the example adapters 230*a-b*, 235 without requesting end user(s) involvement (e.g., without requesting the end user(s) select a widget(s) 310). In examples disclosed herein, the end user(s) may configure the example computing environment 100 to upload and execute any one or type(s) of action adapter 230*a-b* and/or AC adapter(s) 235 in response to an alert.

During automatic compute issue(s) remediation, the example adapter uploader 410 identifies and determines example action adapters 230*a-b* and/or AC adapters 235 required to perform any type(s) of action. The example action uploader 410 accesses the example adapter repository 205 and retrieves certain ones of the example action adapters 230*a-b* and/or AC adapters 235 for execution by the example adapter executor 415.

The example adapter uploader 410 also facilitates manual compute issue(s) remediation when an alert is not generated. For example, the end user(s) may access and select one or more widgets 310 designated to perform one or more actions (e.g., when reviewing information presented by the resource manager 108 about the resource platform(s) 102. When the end-user selects a widget(s) 310 configured to execute an action, the example adapter uploader 410 retrieves a selected action from the example adapters 230*a-b* and/or 235 associated with the selected widget(s) 310. The example permission checker 405 may also determine whether an end user(s) is entitled, or has permission, to access certain actions when an alert is not generated.

When an end user selects a widget(s) 310 designated to create/upload a new action, the example adapter uploader 410 presents the example script interface(s) 305 via the example client interface(s) 110. In examples disclosed herein, an end user may select a widget(s) 310 to create/upload new actions by configuring, manipulating, and/or modifying existing, or stored, action adapters 230*a-b* and/or AC adapters 235. In examples disclosed herein, the end user(s) may also add a new action(s) to an existing adapter(s) (e.g., one(s) of the adapters 225-235 of the example adapter repository 205). In some examples, the end user(s) may create a new action(s) from any action adapter 230*a-b* and/or AC adapter(s) 235 stored in the example adapter repository 205. In some examples, before an end user(s) can create a new action(s), the example permission checker 405 may determine whether the end user(s) is entitled, or has permission, to create the new action(s).

In examples disclosed herein, an end user may access a configuration model(s) associated with the example action adapters 230*a-b* and/or AC adapters 235 via the script interface 305. The end user may configure, manipulate, and/or modify the configuration model(s) to apply a new action to a same or different computing resource(s) of the example resource platform(s) 102. In some examples, certain ones of the action adapters 230*a-b* and/or AC adapters 235 include a configuration model(s) defining an action(s) performable on one of the example compute nodes 112*a-c*, the example manager(s) 114, the example host(s) 116, and/or the example physical resource(s) 118. In such examples, the end user(s) may configure, manipulate, and/or modify the configuration model(s) via the example script interface 305 to create a new action performable on a different one of the example compute nodes 112*a-c*, the example manager(s) 114, the example host(s) 116, and/or the example physical resource(s) 118.

For example, an end user may configure, manipulate, and/or modify a configuration model(s) associated with one or more of the actions selected by the example alert evaluator 400. In some examples, the configuration model(s) may define an action to increase or decrease a quantity of vCPUs allocated to a virtual machine. In such examples, an end user(s) may configure, manipulate, and/or modify the configuration model(s) to create a new action that defines increasing or decreasing a quantity of CPUs allocated to the example host(s) 116. In examples disclosed herein, an end user(s) may create a new action that is similar in scope to actions defined in the example computing environment 100 (e.g., by adapters 230*a-b*, 235 in the example adapter repository 205). An example implementation of the configuration model(s) is described in conjunction with FIG. 5.

An end user(s) may save, store, and/or download a new action adapter to the example adapter repository 205 upon selection of one or more widgets (e.g., graphical user interface elements) designated for saving new action adapters via the example client interface(s) 110. In some examples, the example adapter uploader 410 serializes the new action adapter (e.g., an XML file or script) in any suitable format and stores the new action adapter in the example adapter repository 205. The new action adapters may be retrievable from the example adapter repository 205 as action adapters 230*a-b* and/or AC adapter(s) 235.

While an example manner of implementing the example action manager 220 of FIG. 2 is illustrated in FIG. 4, one or more of the elements, processes and/or devices illustrated in FIG. 4 may be combined, divided, re-arranged, omitted, eliminated and/or implemented in any other way. Further, implementing the example alert evaluator 400, the example permission checker 405, the example adapter uploader 410, the example adapter executor 415, and the example action status determiner 420 of FIG. 4 may be implemented by hardware, software, firmware and/or any combination of hardware, software and/or firmware. Thus, for example, any of the example alert evaluator 400, the example permission checker 405, the example adapter uploader 410, the example adapter executor 415, and the example action status determiner 420 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example alert evaluator 400, the example permission checker 405, the example adapter uploader 410, the example adapter executor 415, and the example action status determiner 420 are hereby expressly defined to include a tangible computer readable storage device or storage disk such as a memory, a digital versatile disk (DVD), a compact disk (CD), a Blu-ray disk, etc. storing the software and/or firmware. Further still, the example action manager 220 of FIG. 2 may include one or more elements, processes and/or devices in addition to, or instead of, those illustrated in FIG. 4, and/or may include more than one of any or all of the illustrated elements, processes and devices.

Figure 5:
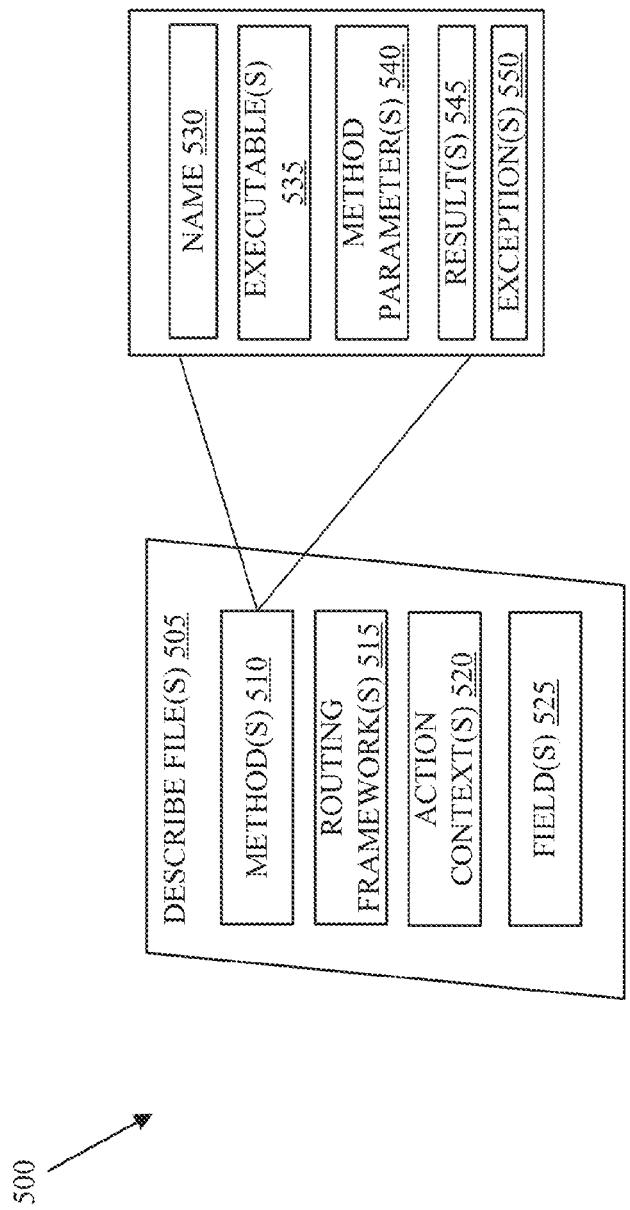
FIG. 5 is a block diagram of an example configuration model included in the example action adapters and/or the example AC adapter(s) of FIG. 2.

FIG. 5 is a block diagram of an example configuration model 500 included in the example action adapters 230*a-b* and/or the example AC adapter(s) 235 of the example resource manager 108 of FIG. 2. In examples disclosed herein, the example configuration model 500 may be an XML file, a script, etc. The example configuration model 500 may be accessed by an end user(s) via the example script interface 305. In examples disclosed herein, an end user(s) may configure, manipulate, modify, and/or edit the example configuration model 500 via the script interface 305. In some examples, an end user(s) may configure, manipulate, modify, and/or edit the example configuration model 500 to create new actions performable on compute resources of the example resource platform(s) 102. The example configuration model 500 includes an example DESCRIBE file(s) 505.

The example DESCRIBE file(s) 505 is an XML file that defines actions and associates actions with compute resources of the example resource platform(s) 102. In examples disclosed herein, the example adapter uploader 410 creates Java objects using the example DESCRIBE file(s) 505. In examples disclosed herein, the example adapter uploader 410 persists the example action adapters 230*a-b* and/or the example AC adapter(s) 235 with corresponding DESCRIBE files 505 from the example adapter repository 205. The example DESCRIBE file(s) 505 includes an example method(s) 510, an example routing framework(s) 515, an example action context(s) 520, and an example field(s) 525.

The example method(s) 510 is a model that defines how the example action adapter 230*a-b* and/or the AC adapter(s) 235 is executed. The example method(s) 510 defines or specifies the action, or operation and/or function, that the example action adapter 230*a-b* and/or AC adapter(s) 235 is configured to perform. In examples disclosed herein, the example method(s) 510 includes, or defines, an example name 530, an example executable 535, an example method parameter(s) 540, an example result(s) 545, and an example exception(s) 550.

The example routing framework(s) 515 is a model that defines which ones of the compute resources of the example resource platform(s) 102 an action should be routed to. In some examples, the example routing framework(s) 515 defines a UUID corresponding to ones of the example compute nodes 112*a-c*, the example manager(s) 114, the example host(s) 116, and/or the example physical resource(s) 118. In some examples, the example routing framework(s) 515 may define that certain tasks, or sub-actions, be performed by different ones of the example action adapters 230*a-b* and/or AC adapter(s) 235. For example, the example adapter executor 415 may execute the example routing framework(s) 515 and advise the example adapter uploader 410 to upload a different action adapter 230*a-b* and/or AC adapter(s) 235 to perform a separate task, or sub-action, of the action being performed.

The example action context(s) 520 is a model that defines a compute resource(s) of the example resource platform(s)

102 that the action applies to. The example action context(s) 520 also describes parents and/or descendants of the compute resource(s) that the action is performed on. The example action context(s) 520 enables the action to be integrated on the compute resource(s) the action applies to, as well as the parents and/or descendants of the compute resource(s).

The example field(s) 525 is a model that defines contextual information about the resource. The example field(s) 525 may define aspects of the action to be monitored. The example adapter executor 415 may execute the example field(s) 525 to return a status(es) or condition(s) of a compute resource(s) the action is performed on such as, for example, a power state.

Turning to the example method(s) 510, the example name 530 defines a name of an action. For example, if an action increases or decreases a quantity of vCPUs allocated to a virtual machine, the example name 530 may be, for example, "Set CPU Count for VM." In some examples, the example name 530 may be displayed as text denoting an example widget(s) 310 via the client interface(s) 110.

The example executable 535 of the example method(s) 510 defines a script file format. In some examples the example executable 535 defines a Python file format. If the example method name 535 is "Set CPU Count for VM," the example executable 535 may be, for example, "SetCPU.py" to define the script file format. In examples disclosed herein, the example executable 535 may define any type(s) of script file format.

The example method parameter(s) 540 of the example method(s) 510 includes a data type(s) necessary for action execution. For example, the example method parameter(s) 540 may include data types such as strings, integers and lists. In some examples, the example method parameter(s) 540 identifies a compute resource of the example resource platform(s) 102 that the action is configured to be performed on.

The example result(s) 545 of the example method(s) 510 defines results returned from the example executable 535. The example exception(s) 550 defines exceptions the example executable 535 could potentially raise.

In examples disclosed herein, the example configuration model 500 may include any other type(s) of model, file, script, etc. to model compute resources of the example resource platform(s) 102 that the example collection adapters 225a-b collect.

The example adapter uploader 410 and the example adapter executor 415 may upload and execute, respectively, ones of the example action adapters 230a-b and/or the AC adapter(s) 235 based on the example DESCRIBE file(s) 505. In examples disclosed herein, an end user(s) may configure, manipulate, modify, and/or edit any ones of parts or components of the example DESCRIBE file(s) 505 such as, for example, the example method(s) 510, the example routing framework(s) 515, the example action context(s) 520, the example field(s) 525, the example name 530, the example executable(s) 535, the example method parameter(s) 540, the example result(s) 545, and/or the example exception(s) 550 via the example script interface 305.

Flowcharts representative of example machine readable instructions for implementing the example resource manager 108 of FIG. 1—are shown in FIGS. 6-11. In these examples, the machine readable instructions comprise a program(s) for execution by a processor such as the processor 1212 shown in the example processor platform 1200 discussed below in connection with FIG. 12. The program(s) may be embodied in software stored on a tangible computer readable storage medium such as a CD-ROM, a floppy disk, a hard drive, a digital versatile disk (DVD), a Blu-ray disk, or a memory associated with the processor 1212, but the entire program(s) and/or parts thereof could alternatively be executed by a device other than the processor 1212 and/or embodied in firmware or dedicated hardware. Further, although the example program(s) are described with reference to the flowchart illustrated in FIGS. 6-11, many other methods of implementing the example resource manager 108 may alternatively be used. For example, the order of execution of the blocks may be changed, and/or some of the blocks described may be changed, eliminated, or combined.

As mentioned above, the example processes of FIGS. 6-11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 6:
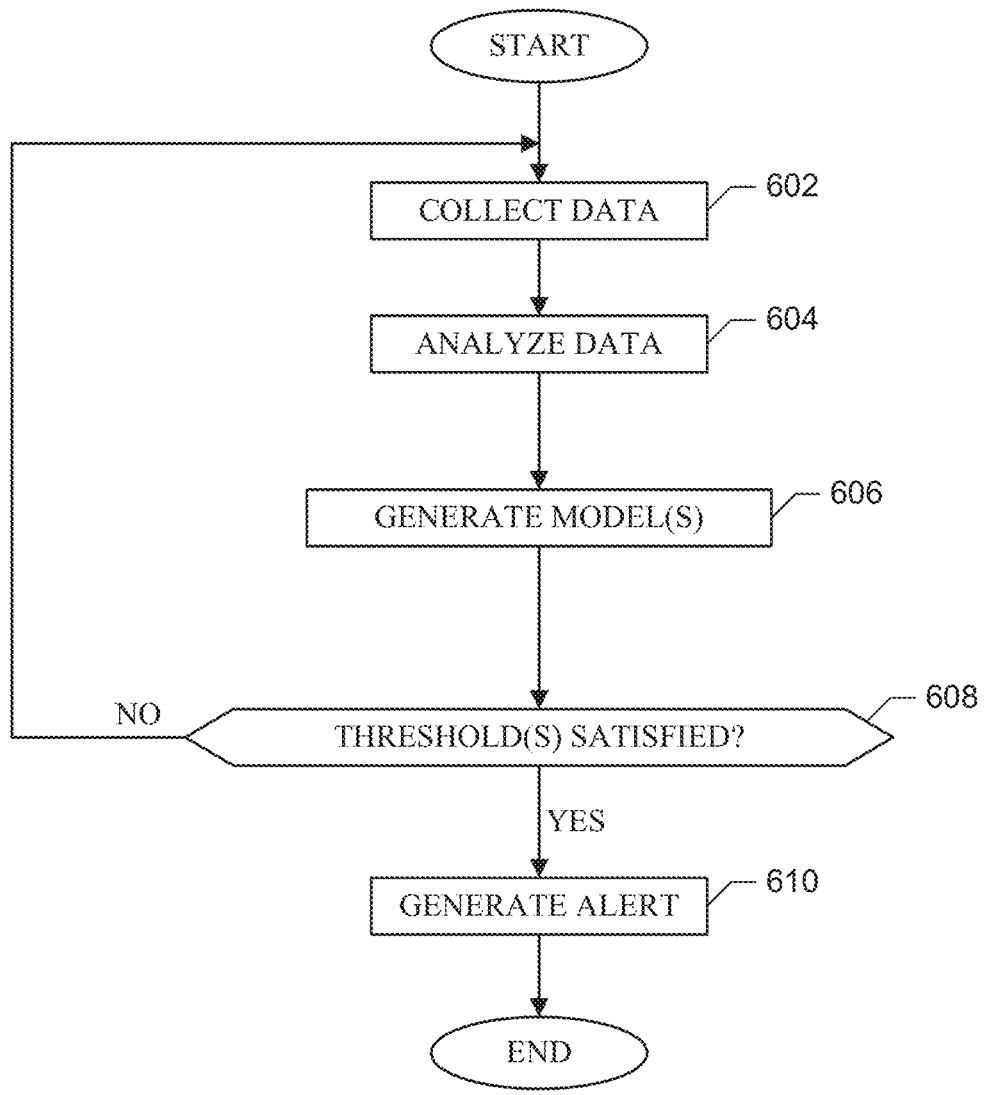
FIG. 6-11 are flowcharts representative of example machine readable instructions that may be executed to implement the example resource manager FIGS. 1 and/or 2.

FIG. 6 is a flowchart representative of machine readable instructions that may be executed to trigger an alert by the example resource manager 108. The example flowchart begins when the example resource manager 108 collects data regarding the operation of a compute node (e.g., the example compute node 112a) (block 602). For example, the example collection 200 of the example resource manager 108 may determine a processor utilization for the example compute node 112a. The example analytics engine 210 analyzes the collected data (block 604). Using the analyzed data, the example analytics engine 210 generates a model(s) of the analyzed data (block 606). For example, the analytics engine 210 may generate a statistical model indicative of the operational state of the compute node 112a. The example alert determiner 215 determines if the modeled data satisfies a threshold (e.g., meets the threshold, exceeds the threshold, is less than the threshold) (block 608). When the modeled data does not satisfy the threshold, control returns to block 602 to collect further data. When the modeled data satisfies the threshold, the example alert determiner 215 triggers an alert to be issued (block 610). For example, the alert determiner 215 may determine that the processor utilization of the compute node 112a exceeds for threshold desired operation and may, thus, trigger an alert. For example, the alert may be presented to a user (e.g., presented to the user in conjunction with an option for the user to select a remediation action configured in the adapter repository 205) and/or may trigger automatic performance of an action (e.g., a remediation action configured in the example adapter repository 205).

Figure 7:
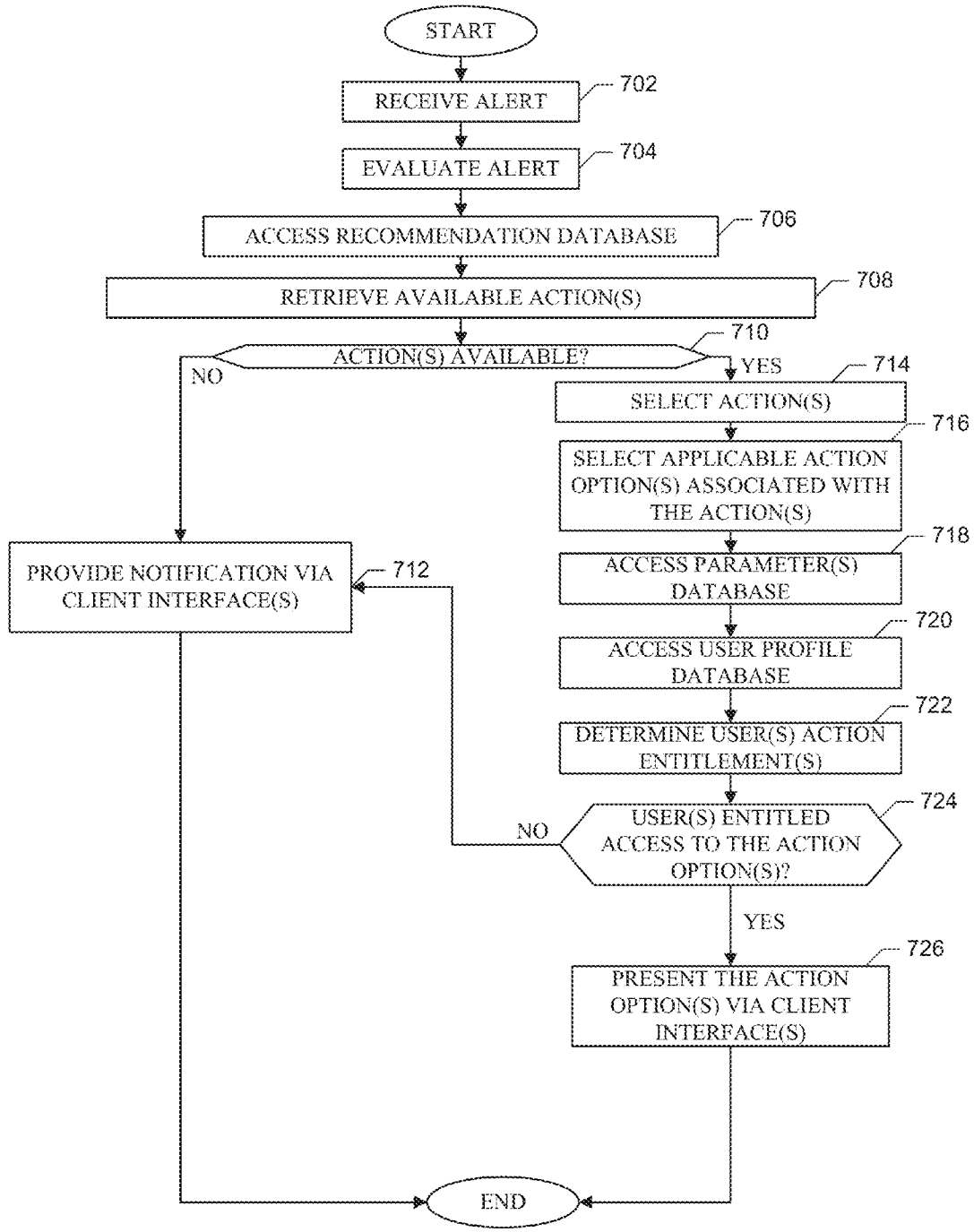

FIG. 7 is a flowchart representative of machine readable instructions that may be executed to process an alert by the example resource manager 108.

The process of FIG. 7 begins when the example alert evaluator 400 of the example action manager 220 receives a new alert (e.g., an alert issued by the example alert determiner 215) (block 702). The example alert evaluator 400 evaluates the alert to identify characteristics of the alert (block 704). For example, the example alert evaluator 400 determines identifying information, such as a UUID, for a computing resource that triggered and/or is associated with the alert. The example alert evaluator 400 accesses the example access recommendation database 430 (block 706) and retrieves any actions associated with the determined identifying information (block 708). For example, the example alert evaluator 400 may retrieve any actions that are associated with a UUID that identifies the type of the computing resource that triggered the alert. The example alert evaluator 400 determines if there are any available actions (block 710). When there are no available actions, the example action status determiner 420 provides a notification to a user interface identifying the alert (e.g., without identifying or automatically performed an action) (block 712) and the execution of the process of FIG. 7 ends.

When the example alert evaluator 400 determines that there are actions available (block 710), the example adapter executor 415 selects the action(s) (block 714). For example, the action(s) maybe selected serially, in parallel, etc. The example adapter executor 415 selects any applicable option(s) associated with the action(s) (block 716). For example, if the alert were an alert that CPU utilization is high and the selected action is to increase the number of CPUs, an option for the action may be the current number of CPUs. Based on the option(s) associated with the action(s), the example adapter executor 415 retrieves the parameter(s) for use with the action(s) from the example parameter(s) database 425 (block 718). For example, the example adapter executor 415 communicates with the example parameter(s) database 425 via the example alert evaluator 400. According to the CPU utilization example, the adapter executor 415 may retrieve, from the parameter(s) database 425, the number of existing CPUs for a resource(s) that triggered the alert.

The example permission checker 405 then accesses the example user profile database 435 (block 720). The example permission checker 405 determines user entitlements associated with the retrieved action(s) (block 722). The example permission checker 405 determines if a current user (e.g., a user that is accessing alerts is entitled to perform the action(s) (block 724). When the user is not entitled to perform the action(s), the alert notification is presented (block 712) and the process of FIG. 7 ends. When the user is entitled to perform the action(s), the example action status determiner 420 presents a notification of the alert along with an indication of the action(s) that may be performed (e.g., the actions for adapter associated with the type of computing resource identified by the example alert evaluator 400) block 726. The process of FIG. 7 then completes.

Figure 8:
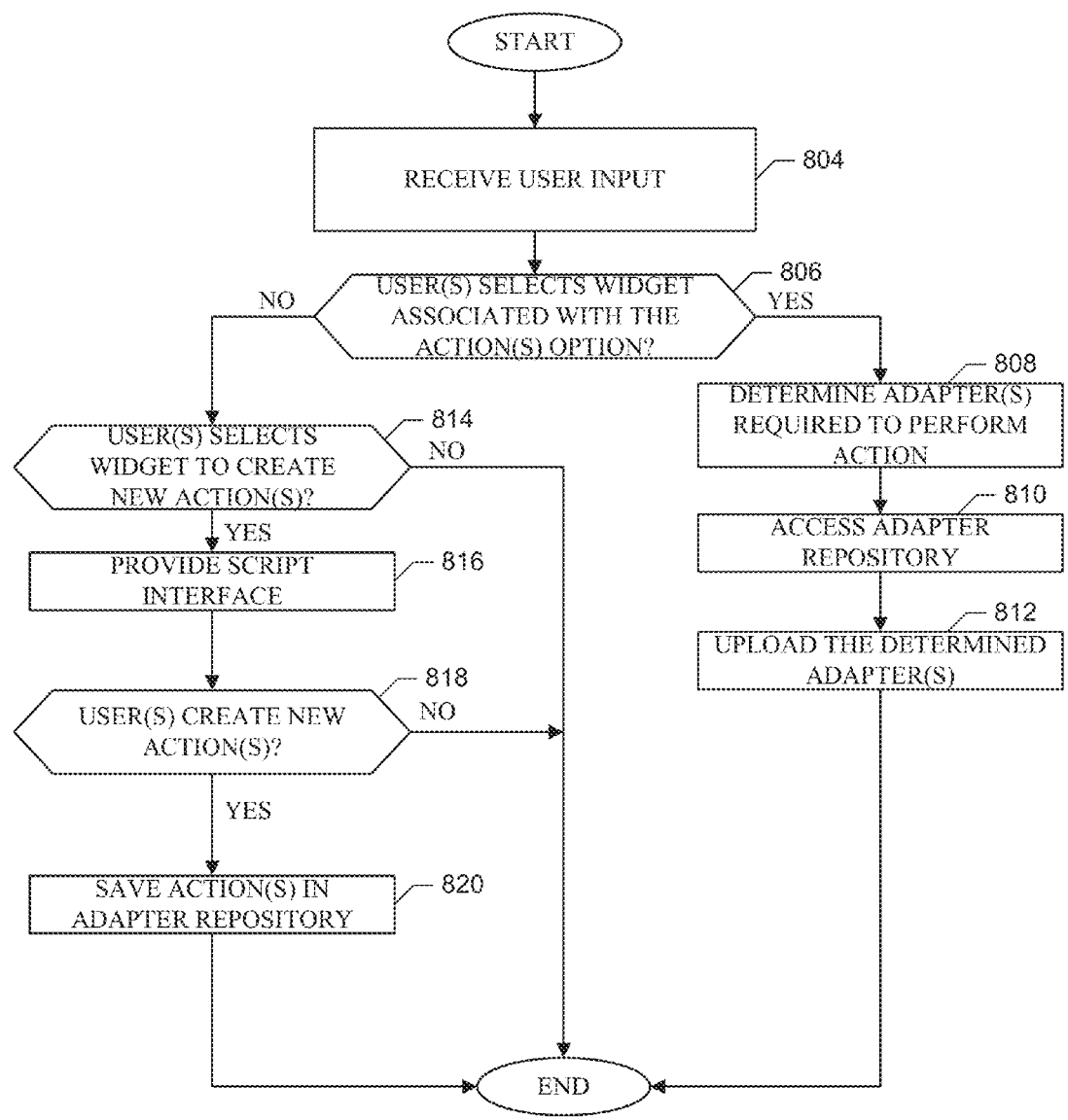

FIG. 8 is a flowchart representative of machine readable instructions that may be executed to process user input regarding actions by the example resource manager 108.

The process of FIG. 8 begins when the example action status determiner 420 receives a user input (e.g., a user input on a display of an alert from block 726 of the process illustrated in FIG. 7) (block 804). The example action status determiner 420 determines if the user has selected a widget (e.g., icon, button, link, etc.) associated with an action (block 806). When the user has selected an action, the example adapter executor 415 determines an adapter(s) that is associated with the action (block 808). The example adapter uploader 410 accesses the example adapter repository 205 (block 810) and retrieves the identified adapter(s) (block 812). The process of FIG. 8 is then completed. For example, the process may continue with the process illustrated in FIG. 9.

When the user has not selected a widget associated with an action (block 806), the example action status determiner 420 determines if the user has selected a widget to create a new action(s) (block 814). When the user has not selected to create a new action (or selected an action in block 806), the process of FIG. 8 ends. For example, the user may have selected a widget to cancel an alert dialog.

When the user has selected to create a new action (block 814), the example action status determiner 420 causes the example script interface 305 to be presented so that the user may input the script associated with the new action (block 816). The example action status determiner 420 determines if the user has created a new action(s) (block 818). When the user has not created a new action, the process of FIG. 8 completes. When the user has created a new action, the example adapter uploader 410 stores the action in the example adapter repository 205 (block 820). The process of FIG. 8 then completes.

Figure 9:
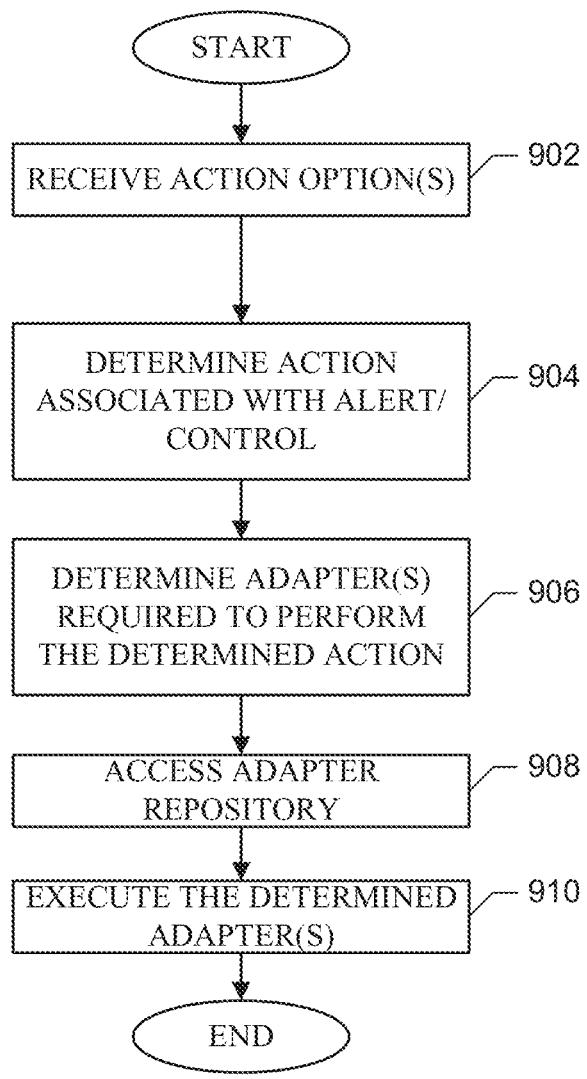

FIG. 9 is a flowchart representative of machine readable instructions that may be executed to execute an action by the example resource manager 108.

The process of FIG. 9 begins when the example adapter executor 415 receives option(s) associated with an action (block 902). For example, the adapter executor 415 may receive an identification of a computing resource (e.g., a UUID associated with the type of computing resource that triggered an alert or is associated with a control selected by a user). The example alert evaluator 400 determines actions associated with the alert and/or control (block 904). The example adapter executor 415 determines adapters that are needed for performing identified actions (block 906). The example adapter uploader 410 accesses the example adapter repository 205 to retrieve the adapter(s) (block 908). The example adapter executor 415 then executes the adapter (block 910). For example, if the user accesses a menu control associated with CPU utilization, a user may select an action to add additional CPUs to a virtual computing resource in the example resource platform 102. The example adapter repository 205 may have been previously loaded with an adapter that includes a script that adds the additional CPU resources by accessing an API of the example manager 114 and/or the example cloud manager 106.

Figure 10:
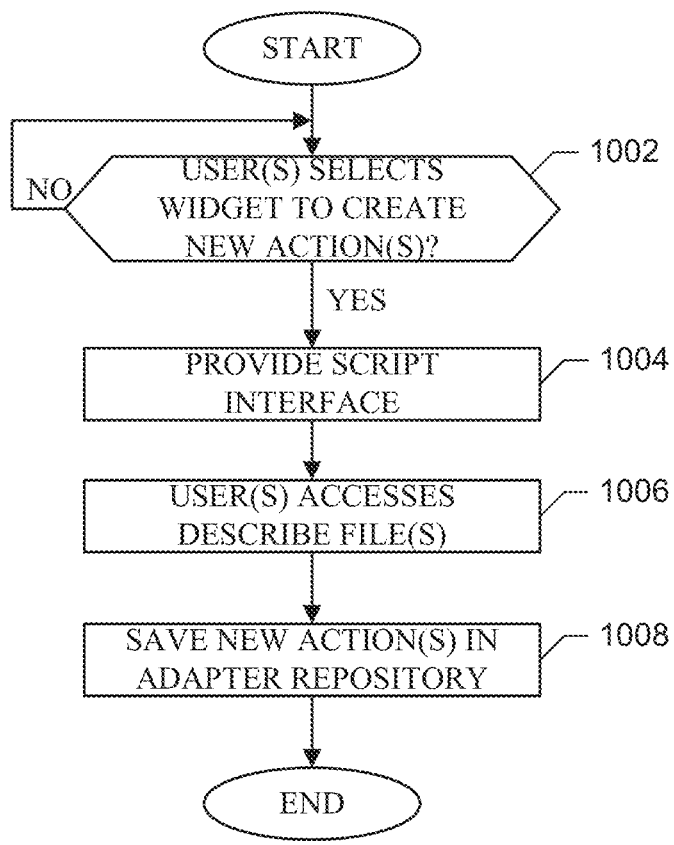

FIG. 10 is a flowchart representative of machine readable instructions that may be executed to create a new action by the example resource manager 108.

The process of FIG. 10 begins when a user selects a widget (e.g., an icon, a control, a button, etc.) to create a new action (block 1002). The example action status determiner 420 presents the example script interface 305 to allow the user to input a script for the new action (block 1004). The example user inputs the action details in the scrip interface 305 using DESCRIBE file(s) (block 1006). The example adapter uploader 410 stores the new action(s) in the example adapter repository 205 (block 1008). The process of FIG. 10 then ends.

Figure 11:
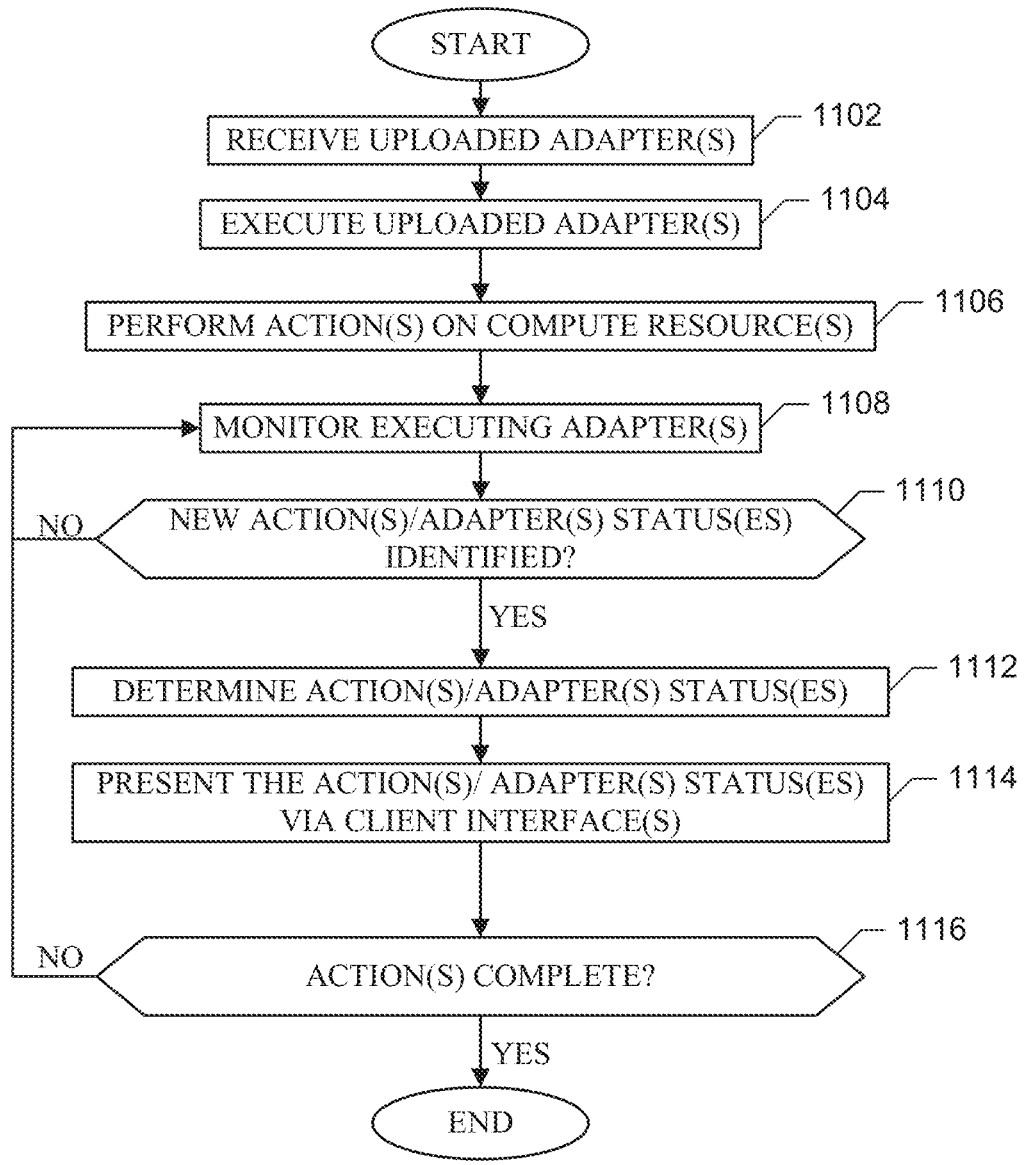

FIG. 11 is a flowchart representative of machine readable instructions that may be executed to execute an action of an adapter by the example resource manager 108.

The process of FIG. 11 begins when the example adapter uploader 410 provides an adapter(s) to the example adapter executor 415 (block 1102). The example adapter executor 415 executes the action associated with the received adapter(s) (block 1004) to perform the action(s) of the adapter(s) on computing resources (e.g., computing resources of the example resource platform(s) 102) (block 1106). The example action status determiner 420 monitors the executing adapter(s) to track the status of execution (block 1108). The example action status determiner 420 determines if a new status is identified (e.g., that an execution status has changed) (block 1110). When a status has changed the example action status determiner 420 determines the new execution status (block 1112). The example action status determiner 420 presents the new action status via the example client interfaces 110 (e.g., via the example dashboard(s) 300) (block 1114). The example action status determiner 420 then determines if there all action(s) are complete (block 1116). If all action(s) are not completed, control returns to block 1108 to continue monitoring action execution. If all action(s) are completed, the process of FIG. 11 ends.

Figure 12:
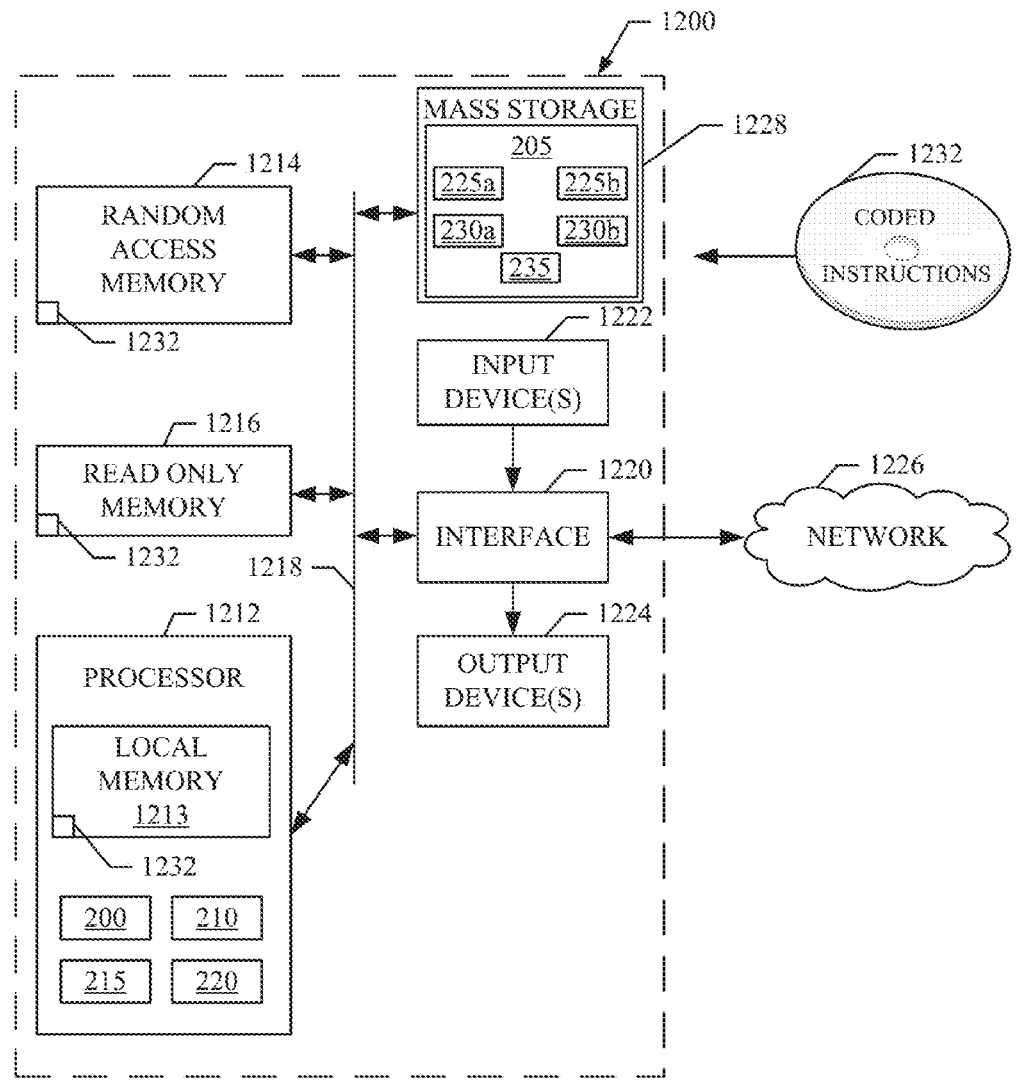
FIG. 12 is a block diagram of an example processor system structured to execute the example machine readable instructions represented by FIGS. 6-11 to implement the example resource manager FIGS. 1 and/or 2.

FIG. 12 is a block diagram of an example processor platform 1200 capable of executing the instructions of FIGS. 6-11 to implement the example resource manager 108 of FIGS. 1 and/or 2. The processor platform 1200 can be, for example, a server, a personal computer, an Internet appliance, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. In the illustrated example, the processor 1212 implements the example collector 200, the example analytics engine 210, the example alert determiner 215, and the example action manager 220 of FIG. 2.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives. The mass storage 1228 may include and/or implement the example adapter repository 205 of FIG. 2. The mass storage 1228 may store the example collection adapters 225*a-b*, the example action adapters 230*a-b*, and the example AC adapter(s) 235 of FIG. 2.

The coded instructions 1232 of FIGS. 6-11 may be stored in the mass storage device 1228, in the volatile memory 1214, in the non-volatile memory 1216, and/or on a removable tangible computer readable storage medium such as a CD or DVD.

Figure 13:
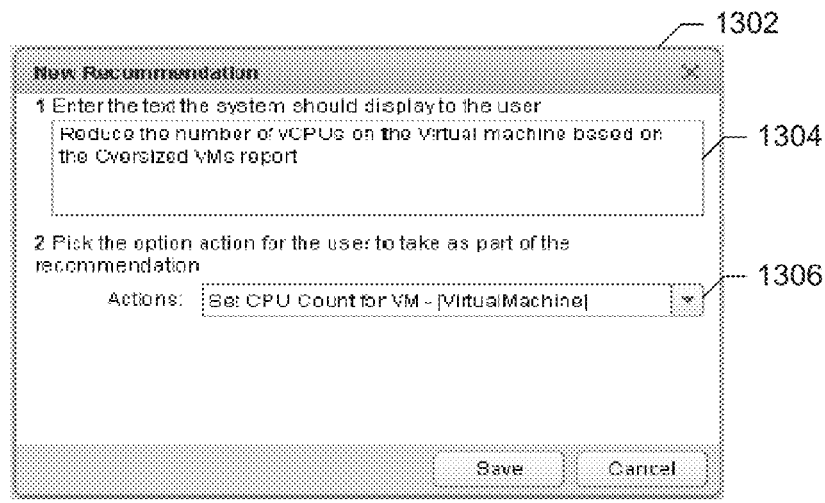
FIG. 13 illustrates an example graphical user interface that may be accessed by a user to assign an action to a recommendation.

FIG. 13 illustrates an example graphical user interface 1302 that may be accessed by a user to assign an action to a recommendation. The example graphical user interface includes a first input element 1304 in which a user may input text to be displayed to a user along with the recommendation. The example graphical user interface includes a second input element 1306 in which a user may select an action (e.g., an action added to the system by an adapter stored in the example adapter repository 215).

Figure 14:
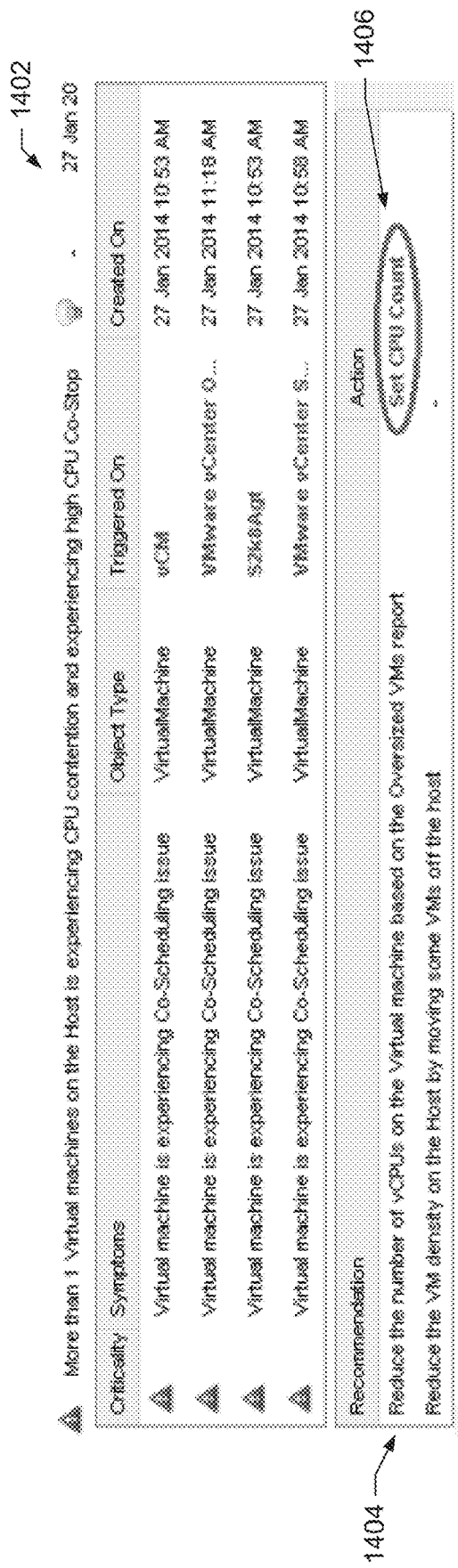
FIG. 14 illustrates an example graphical user interface that may be presented to a user to provide a recommendation associated with an alert.

FIG. 14 illustrates an example graphical user interface 1402 that may be presented to a user to provide a recommendation associated with an alert. The example graphical user interface 1402 includes a recommendation 1404 associated with the alert. The example recommendation 1404 was previously assigned an action (e.g., an action added to the system by an actionable adapter). The example graphical user interface 1402 includes a link 1406 to the action to allow a user to perform the action directly from the example graphical user interface 1402 (e.g., without moving to a new different interface or component).

Figure 15:
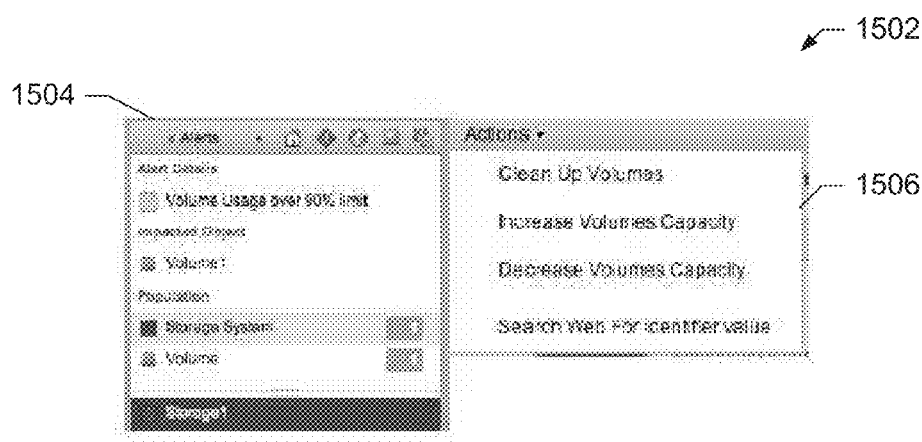
FIG. 15 illustrates an example graphical user interface 1502 that may be presented by the example resource manager 108.

FIG. 15 illustrates an example graphical user interface 1502 that may be presented by the example resource manager 108. The example graphical user interface 1502 includes a first user interface 1504 in which information about a computing environment (e.g., the example resource platform(s) 102) is presented. The example graphical user interface 1502 includes a second user interface 1506 that is presented when a user has selected a component of the example first user interface 1504. The example second user interface 1506 identifies and allows a user to select actions that have been added to the example resource manager 108 and associated with the type of component selected from the first user interface 1504. For example, the actions may be actions that have been uploaded with adapters stored in the example adapter repository 205.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
   a virtual machine resource platform comprising a processor and a memory to host a virtual compute node;
   a client graphical user interface; and
   a resource manager to:
     install an interface on the virtual compute node to receive an adapter specifying a first action that executes on the virtual compute node;
     install the adapter on the virtual compute node by processing an adapter definition to identify the first action specified by the adapter;
     trigger an alert based on collected data from execution of the virtual compute node, the alert identifying at least one issue with the virtual compute node;
     in response to the alert, determine recommended actions that, when executed, would support resolving the at least one issue, the recommended actions including the first action, and a second one of the recommended actions to create a new action, wherein when a current user of the client graphical user interface does not have permission to create new actions, the second one of the recommended actions is not populated;
     when the recommended actions are determined, present the determined actions on the client graphical user interface;
     when no recommended actions are determined, present a notification on the client graphical user interface that no recommended actions exist;
     in response to receiving user input selecting an action from the presented recommended actions:
     trigger the selected action to be executed using a parameter extracted from the collected data; and
     execute the selected action using the parameter on the virtual compute node.

2. A system as defined in claim 1, wherein the resource manager is to monitor the execution of the selected action.

3. A system as defined in claim 2, wherein the resource manager is to present a result of the execution of the selected action on the client graphical user interface.

4. A system as defined in claim 1, wherein the adapter is a first adapter and the alert is triggered by collected data collected by a second adapter.

5. A system as defined in claim 1, wherein the adapter initiates execution of the selected action via an interface to a script.

6. A system as defined in claim 1, wherein the client graphical user interface is configured to:
   receive an identification of an action; and
   receive a parameter collected by the resource manager.

7. A method to manage actions in a computing environment, the method comprising:
   installing an interface on a virtual compute node to receive an adapter specifying a first action, the first action to execute on the virtual compute node hosted on a virtual machine resource platform;
   installing the adapter on the virtual compute node by processing an adapter definition to identify the first action specified by the adapter;
   triggering an alert based on collected data from execution of the virtual compute node, the alert identifies at least one issue with the virtual compute node;
   in response to the alert, determine recommended actions that, when executed, would support resolving the at least one issue, the recommended actions including the first action, and a second one of the recommended actions to create a new action, actions wherein when a current user of the client graphical user interface does not have permission to create new actions, the second one of the recommended actions is not populated;
   when the recommended actions are determined, presenting the determined actions on the client graphical user interface;
   when no recommended actions are determined, present a notification on the client graphical user interface that no recommended actions exist;
   in response to receiving user input selecting an action from the presented recommended actions:
   triggering the selected action to be executed using a parameter extracted from the collected data; and
   executing the selected action using the parameter on the virtual compute node.

8. A method as defined in claim 7, further including monitoring the execution of the selected action.

9. A method as defined in claim 8, further including presenting a result of the execution of the selected action on the client graphical user interface.

10. A method as defined in claim 7, wherein the adapter is a first adapter and the alert is triggered by collected data collected by a second adapter.

11. A method as defined in claim 7, wherein the adapter initiates execution of the selected action via an interface to a script.

12. A method as defined in claim 7, further including:
    receiving an identification of an action; and
    receiving a parameter collected by the resource manager.

13. A tangible computer readable storage medium comprising instructions that, when executed cause a machine to at least:
    install an interface on the virtual compute node to receive an adapter specifying a first action that executes on the virtual compute node;
    install the adapter on the virtual compute node by processing an adapter definition to identify the first action specified by the adapter;
    trigger an alert based on collected data from execution of the virtual compute node, the alert identifies at least one issue with the virtual compute node;
    in response to the alert, determine recommended actions that, when executed, would support resolving the at least one issue, the recommended actions including the first action, and a second one of the recommended actions to create a new action, wherein when a current user of the client graphical user interface does not have permission to create new actions, the second one of the recommended actions is not populated;
    when the recommended actions are determined, present the determined actions on the client graphical user interface;

when no recommended actions are determined, present a notification on the client graphical user interface that no recommended actions exist;

in response to receiving user input selecting an action from the presented recommended actions:

trigger the selected action to be executed using a parameter extracted from the collected data; and execute the selected action using the parameter on the virtual compute node.

14. A tangible computer readable storage medium as defined in claim 13, wherein the instructions, when executed, cause the machine to monitor the execution of the selected action.

15. A tangible computer readable storage medium as defined in claim 14, wherein the instructions, when executed, cause the machine to present a result of the execution of the selected action on the client graphical user interface.

16. A tangible computer readable storage medium as defined in claim 13, wherein the adapter is a first adapter and the alert is triggered by collected data collected by a second adapter.

17. A tangible computer readable storage medium as defined in claim 13, wherein the adapter initiates execution of the selected via an interface to a script.

18. A tangible computer readable storage medium as defined in claim 13, wherein the instructions, when executed, cause the machine to:

receive an identification of an action; and receive a parameter collected by the resource manager.

* * * * *

UNITED STATES PATENT AND TRADEMARK OFFICE
CERTIFICATE OF CORRECTION

PATENT NO. : 10,110,505 B2
APPLICATION NO. : 15/245300
DATED : October 23, 2018
INVENTOR(S) : Smith et al.

Page 1 of 1

It is certified that error appears in the above-identified patent and that said Letters Patent is hereby corrected as shown below:

In the Claims

Column 32, Line 14 (Claim 7), please delete the word "actions"

Signed and Sealed this
Nineteenth Day of November, 2019

Andrei Iancu
*Director of the United States Patent and Trademark Office*